United States Patent
Moeller et al.

(10) Patent No.: US 10,109,116 B2
(45) Date of Patent: Oct. 23, 2018

(54) DEVICE, SYSTEM AND METHOD FOR AGGREGATING NETWORKS AND SERVING DATA FROM THOSE NETWORKS TO COMPUTERS

(71) Applicant: Road-IQ, LLC, Bellingham, WA (US)

(72) Inventors: Mark M. Moeller, Everson, WA (US); Lester Meeks, Lynden, WA (US); Rory N. Mcleod, Lynden, WA (US); Collin J. Topolski, Bellingham, WA (US); Ilko Dossev, Pickering (CA); Peter John Whitehead, Grafton, WI (US); Jeffery R. Porter, New Berlin, WI (US)

(73) Assignee: Road-IQ, LLC, Bellingham, WA (US)

( * ) Notice: Subject to any disclaimer, the term of this patent is extended or adjusted under 35 U.S.C. 154(b) by 0 days.

(21) Appl. No.: 15/206,444

(22) Filed: Jul. 11, 2016

(65) Prior Publication Data

US 2017/0039782 A1    Feb. 9, 2017

Related U.S. Application Data

(63) Continuation of application No. 14/208,349, filed on Mar. 13, 2014, now Pat. No. 9,387,813, which is a (Continued)

(51) Int. Cl.
*G07C 5/00* (2006.01)
*H04N 7/18* (2006.01)
(Continued)

(52) U.S. Cl.
CPC ........... *G07C 5/008* (2013.01); *B60R 1/00* (2013.01); *B60R 11/04* (2013.01); *G07C 5/0866* (2013.01);
(Continued)

(58) Field of Classification Search
CPC ........ G07C 5/008; G07C 5/0866; H04N 5/44; H04N 5/247; H04N 5/23293; B60R 1/00;
(Continued)

(56) References Cited

U.S. PATENT DOCUMENTS

| 5,949,345 A | 9/1999 | Beckert et al. |
| 7,085,710 B1 | 8/2006 | Beckert et al. |

(Continued)

FOREIGN PATENT DOCUMENTS

| EP | 2664502 A1 | 11/2013 |
| WO | 2007066064 A1 | 6/2007 |

OTHER PUBLICATIONS

Supplementary European Search Report with Communication dated Nov. 20, 2017 for Application No. EP 15762386.

*Primary Examiner* — Ernest Unelus
*Assistant Examiner* — Ronald T Modo
(74) *Attorney, Agent, or Firm* — Schiff Hardin LLP

(57) ABSTRACT

Disclosed herein, in one example, is a device for aggregating networks in a vehicle and serving data, including video data, from those networks to a computer for integrating information from various systems in a vehicle, processing that information, and presenting the information to a user in a suitable format. The device for aggregating networks, in another example, is specific to a vehicle and serving data, including video data, from those networks to computers.

18 Claims, 11 Drawing Sheets

Related U.S. Application Data continuation-in-part of application No. 13/838,081, filed on Mar. 15, 2013.

(60) Provisional application No. 61/613,906, filed on Mar. 21, 2012.

(51) Int. Cl.
  *H04N 5/232*   (2006.01)
  *H04N 5/44*    (2011.01)
  *B60R 1/00*    (2006.01)
  *G07C 5/08*    (2006.01)
  *B60R 11/04*   (2006.01)
  *H04N 5/247*   (2006.01)
  *B65F 3/02*    (2006.01)
  *B65F 3/14*    (2006.01)
  *G08B 13/196*  (2006.01)

(52) U.S. Cl.
  CPC ......... *H04N 5/23293* (2013.01); *H04N 5/247* (2013.01); *H04N 5/44* (2013.01); *H04N 7/181* (2013.01); *B60R 2300/105* (2013.01); *B60R 2300/60* (2013.01); *B65F 3/02* (2013.01); *B65F 3/14* (2013.01); *G08B 13/19647* (2013.01)

(58) Field of Classification Search
  CPC .............. B60R 11/04; B60R 2300/60; B60R 2300/105
  See application file for complete search history.

(56) References Cited

U.S. PATENT DOCUMENTS

| | | |
|---|---|---|
| 2002/0017985 A1 | 2/2002 | Schofield et al. |
| 2002/0030595 A1 | 3/2002 | Kasik |
| 2003/0115287 A1 | 6/2003 | Irfan et al. |
| 2003/0191563 A1 | 10/2003 | Eagleton et al. |
| 2005/0160196 A1 | 7/2005 | Dutton et al. |
| 2005/0240342 A1 | 10/2005 | Ishihara et al. |
| 2005/0242969 A1 | 11/2005 | Deutsch et al. |
| 2005/0249379 A1 | 11/2005 | Yoshimura |
| 2006/0017807 A1 | 1/2006 | Lee et al. |
| 2006/0095175 A1* | 5/2006 | deWaal ............... G07C 5/008 701/31.4 |
| 2006/0132604 A1 | 6/2006 | Lao et al. |
| 2006/0200817 A1 | 9/2006 | Callender |
| 2007/0198183 A1 | 8/2007 | Morimoto et al. |
| 2008/0134276 A1 | 6/2008 | Orrell et al. |
| 2010/0073493 A1 | 3/2010 | Godfrey et al. |
| 2010/0256863 A1 | 10/2010 | Nielsen et al. |
| 2011/0063444 A1 | 3/2011 | Okamoto |
| 2011/0106380 A1 | 5/2011 | Wang et al. |
| 2011/0172871 A1 | 7/2011 | Hall et al. |
| 2011/0209181 A1 | 8/2011 | Gupta et al. |
| 2012/0002051 A1 | 1/2012 | Nix |
| 2012/0022780 A1 | 1/2012 | Kulik et al. |
| 2012/0065815 A1 | 3/2012 | Hess |
| 2012/0132402 A1 | 5/2012 | Aoki et al. |
| 2012/0154591 A1* | 6/2012 | Baur .................... B60R 1/00 348/148 |
| 2012/0207088 A1 | 8/2012 | Liu et al. |
| 2012/0209634 A1 | 8/2012 | Ling et al. |
| 2012/0249791 A1* | 10/2012 | Shen ................ H04N 7/181 348/148 |
| 2012/0323491 A1 | 12/2012 | Zhdanov et al. |
| 2013/0107044 A1* | 5/2013 | Azevedo ............. H04N 7/18 348/148 |
| 2013/0204645 A1 | 8/2013 | Lehman et al. |
| 2013/0332004 A1 | 12/2013 | Gompert et al. |
| 2014/0168243 A1 | 6/2014 | Huang |
| 2014/0182951 A1 | 7/2014 | Curotto |
| 2014/0226010 A1 | 8/2014 | Molin et al. |
| 2014/0236472 A1 | 8/2014 | Rosario |

* cited by examiner

Enclosure 11

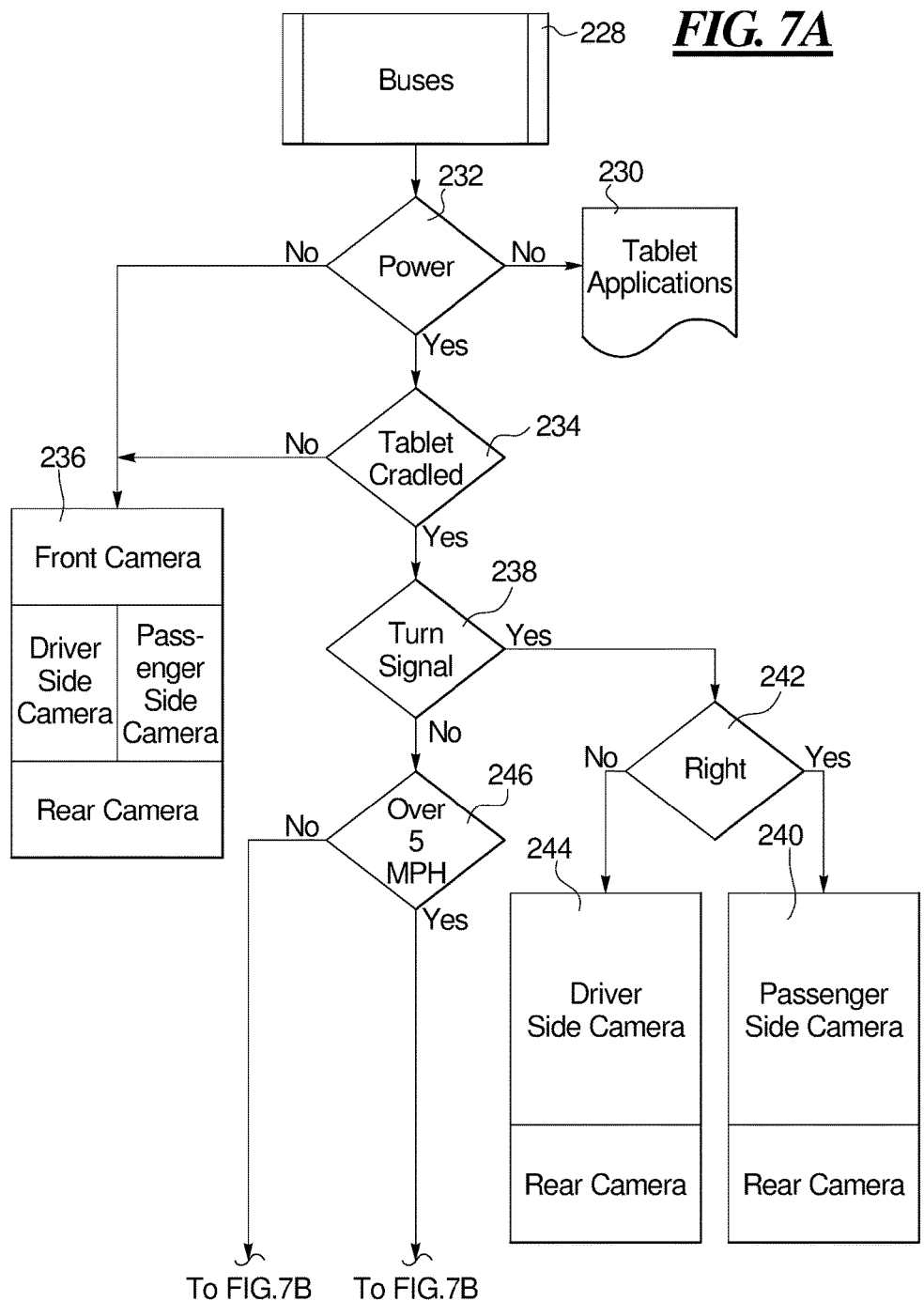

DEVICE, SYSTEM AND METHOD FOR AGGREGATING NETWORKS AND SERVING DATA FROM THOSE NETWORKS TO COMPUTERS

RELATED APPLICATIONS

This application is a continuation application of U.S. patent application Ser. No. 14/208,349, filed Mar. 13, 2014, which is a continuation-in-part of U.S. patent application Ser. No. 13/838,081, filed Mar. 15, 2013, which claims priority benefit of U.S. Provisional Patent Application Ser. No. 61/613,906, filed Mar. 21, 2012, all of which are incorporated herein by reference in their entireties.

BACKGROUND OF THE DISCLOSURE

Field of the Disclosure

This disclosure, in one example, relates generally to an in-vehicle computer system and method. More specifically, the disclosure relates to a device and method for aggregating networks in a vehicle and serving data, including video data, from those networks to computers for integrating information from various systems in a vehicle, processing that information, and presenting it to consumers of information in a suitable format.

SUMMARY OF THE DISCLOSURE

Before beginning a detailed discussion of the apparatus, system, and method, the disclosed features will be outlined, rather broadly, in order that the detailed description to follow may be better understood, and in order that the disclosed apparatus, system and method's novel contribution to the art may be better appreciated. There are additional features of the disclosure that will be described hereinafter. The term "device" is occasionally used in this disclosure to abbreviate the rather lengthy term "disclosed system and apparatus."

In this respect, before explaining a first example of the disclosure in detail, it is to be understood that the disclosed system is not limited in its application to the details of construction or to the arrangements of the components set forth in the following description or illustrated in the drawings. The disclosure, in one example, is capable of other applications and of being practiced and carried out in various ways.

The system, in one example, provides a device for aggregating networks in a vehicle, and serving data from those networks to computers for integrating information from various systems in a vehicle, processing that information, and presenting it to consumers of information in a suitable format. In one example, the device uses a highly integrated system on one or more chips to provide computing resources to operate the disclosed apparatus.

To improve connectivity between components, the device, in one example, includes a vehicle bus interface (such as the SCANTOOL STN1110 interface) to interact with the vehicle's data bus. To allow for wireless communication, the device, in one example, includes a WiFi chipset that can operate in WiFi Access Point, WiFi Client, or WiFi Direct mode, interchangeably. One such chipset providing the desired functionality is the CSR 6031 chipset. Alternatively, the device includes a broadband wireless modem to provide internet connectivity. In one example, the device includes a Bluetooth transceiver and/or a broadband wireless modem. To determine relative movement and/or position of the device, the device may include an accelerometer, gyroscope and/or magnetometer. These components may also be utilized for inertial navigation and three-dimensional (3D) positioning information. In at least one example, the device provides an Ethernet interface for interfacing the aggregated network data to Ethernet-based devices in the vehicle. On one example, the Ethernet or other connective subsystem is utilized to connect the aggregate network to cameras, high speed data busses, or other video peripherals. Such cameras may be utilized, for example, to scan cargo bar codes and quick response (QR) codes.

Certain embodiments provide a device and method for aggregating networks in a vehicle and serving data from those networks to computers, wherein the device provides multiple channel analog video capture interface for collecting video data, digitizing it, compressing it, and saving it as a recording and/or sending it in real-time to another computer, such as a tablet computer or video display glasses, for viewing or recording. The video processing is done primarily on the CPU that has integrated image processing and video compression, for example the FREESCALE i.MX6 Quad applications processor. A preferred embodiment provides between four and eight channels of video capture capability, although other numbers of video channels are possible.

Certain embodiments provide a device and method for aggregating networks in a vehicle and serving data from those networks to computers, wherein the device provides a high speed data channel via a USB interface that allows another computer, such as a tablet computer or phone such as a smart phone, to receive multiple channels of compressed video data efficiently. A preferred embodiment provides six channels of video to the computer device, for display and/or recording.

Certain embodiments provide a device and method for aggregating networks in a vehicle and serving data from those networks to computers, wherein the device provides user control over how the device captures video from attached cameras, such as analog or digital cameras, including control of video resolution, frame rate, scaling, and compression format.

Certain embodiments provide a device and method for aggregating networks in a vehicle and serving data from those networks to computers, wherein the device that is operable to record video from cameras, such as analog or digital cameras, that are attached to the device onto local or remote storage, such as in the tablet computer or another storage device.

Certain embodiments provide a device and method for aggregating networks in a vehicle and serving data from those networks to computers, wherein the device is operable to supply video captured on one or more attached video cameras, such as analog or digital video cameras, to augmented reality viewing devices, such as Google glasses or to one or more displays having fixed or dynamically reconfigurable displays of video data.

Certain embodiments provide a device and method for aggregating networks in a vehicle and serving data from those networks to computers, wherein the device supports companion software that runs on a computer device such as a tablet computer. The software provides control for direct manipulation of how a video stream from the device is viewed on the computer, including control of size of the viewed image, clipping or cropping of the video data, and arrangement of the multiple video channels on the display screen. The companion software also enables recording of the video data on the tablet computer for later playback or for transfer to a server for distribution and/or storage. The companion software is operable to automatically rearrange the displayed video signals when certain input signals from the vehicle are received by the device. For example, the displayed video signals may be arranged in predetermined configurations depending on the operating condition of the vehicle, for example, depending on receipt of information indicating the speed of the vehicle, or that turn signals, brakes, or a reverse gear has been applied or selected by the vehicle driver.

Certain embodiments provide a tablet computer or other computer device in a passenger compartment of a motor vehicle, such as a truck or other vehicle, the computer device being connected to a network device, such as a video data server, also mounted in the vehicle to enable display on the computer device of video data from one or more video cameras mounted on or in the vehicle. The displayed video data may include display of an arrangement of multiple video channels showing multiple views from the cameras to thereby provide the driver with an improved view of vehicles and obstacles, for example, or to monitor conditions of the vehicle, the vehicles load, or other video information as may be desired. The multiple video channel data may be displayed as on separate screen portions or one or more channels may be combined into a combined view such as by simulating a wide angle view with multiple cameras. The displayed video may provide the driver with a view not possible with mirrors or the like, such as a view of blind spots, and so reveal approaching vehicles or road hazards, for example. A truck driver or other driver may have a better view of the road or area around the truck.

The arrangement of the displayed video data may be selected depending on the operating conditions of the vehicle, for example, depending on actions by the driver, movement of the vehicle, or detection of a vehicle system event. For example, activation of a turn signal or turning of the steering wheel by the driver to change lanes or turn a corner may activate or emphasize on the computer device a display of video data from a camera directed in the direction of the vehicle lane change or turn. Backing the vehicle using a reverse gear may result in display of or emphasis of rear facing and side facing video camera data. Forward motion of the vehicle may activate display or emphasize displayed video data directed to the vehicle load as well as an arrangement of displayed video data showing road and traffic conditions around the vehicle. Forward motion by the vehicle may result in the front facing camera data no longer being displayed, since the driver is looking in the forward direction while driving and would be better served by a display of video data from the other cameras. The displayed video may show conditions immediately adjacent the vehicle as well as conditions further away from the vehicle. In certain embodiments, the display screen shows a representation of the vehicle and the video data is displayed relative to the vehicle representation, so that the driver may quickly determine the location and orientation of the video image.

The video data is preferably displayed on the screen in the vehicle passenger compartment after only a very short processing delay. In one example, a video processing system is configured to provide processing, including compression and frame rate selection of the video signal, from camera to display of less than 150 ms. Real time or near real time display of the video data is desired. A system to provide processing with a short processing delay in the display of the video data is important, particularly when the vehicle is moving at high speed or an approaching vehicle is moving at high speed. The system provides short video processing delays even when multiple video channels are being displayed at the same time.

The video data obtained by the video cameras may be recorded for viewing at a later time, for example, by recording the video data on computer readable memory in the tablet computer device. The recorded video data can include recordings of multiple channels of the video data and may include a recording of both video channels that are being displayed and video channels that are not being displayed on the display screen of the tablet computer. For example, a front facing camera video stream may be recorded along with other video data while the vehicle is driving forward, even if the display device is displaying video from side facing and rear facing cameras but not displaying the front facing video camera data. The recorded data may be used where, for example, an incident occurs while the vehicle is being driven to better understand the incident. In one example, another vehicle may swerve or brake so as to be a primary cause of an accident, but that vehicle may have departed the scene, possibly with little or no damage. The recorded video may be used to determine that the driver of the other vehicle was at fault.

The system may include one or more video cameras for recording video data of the interior of the vehicle, such as a recording of the driver while driving. The computer device, such as a tablet computer, may have a front facing camera, which may be used to record the driver video data. The video channel data, including the external and internal video channels, may be synchronized with one another. For example, the internal video channel may show the driver's response to an incident visible on one or more external video channels.

In addition to recording the video, the vehicle system data may be recorded as well, and is preferably synchronized with the video data, either in real time or at a later time. For example, turn signals, brake application, gear selection and engine RPM data may be recorded, along with data from other sensors in the vehicle. The recorded data may be used to determine when the vehicle's brakes were applied relative to an incident that appears in the video data of the camera directed to the road, for example. Selected events in the vehicle systems may trigger marking of the video signal; for example, hard braking by the driver may be marked on the recorded video channel data.

The recorded video data may also be used to determine if the driver of a vehicle made a delivery or pickup, for example. A garbage truck video may show that a refuse container had not been placed at the curb when the truck went by, to answer a question as to whether a pickup was missed. The video data may be used to determine if the driver made a pre-drive inspection of the vehicle load. The link between the computer device and the vehicle systems may enable the driver to test the brake lights or other vehicle systems remotely while walking around the vehicle using the computer device in wireless mode.

In an example of the system, the network device includes connectors and video processing capability for connecting six or more cameras that are mounted about the vehicle and for feeding the compressed video data to the tablet computer for display and for recording. The tablet computer may be used by the driver for other uses, such as for playing music, or when not driving for entering information into work records, browsing the internet, checking email or other computer tasks.

In order to allow various connectivity peripherals to be easily added to the system, the device in one example provides a MiniPCIe expansion slot.

To maintain a properly functioning aggregate network, it is important in certain embodiments that the device has ample RAM and Flash Memory to run common embedded operating system and application software as well as store at least 2 GB of data. It is also important, in many applications, that the device is capable of managing its power consumption. This functionality is important, in some applications, when the vehicle's power gets low, so that the device can sustain itself for days using an internal battery.

It has also proven to be useful, in some applications, to provide a system, wherein the device can switch between a WiFi Client and a WiFi Access Point mode depending on the context in which it is being operated. Connectivity may also be provided by utilizing a Web Server and WebSockets capable of supporting HTML5/CSS3/JS Web Applications on any HTML5 compatible smart devices. In one example, the device includes an installable service provider software module that embodies the core business logic and presents the user interface for that software through HTML5 or related web technologies for any given owner's use of the device.

In one example, the device has a complete network stack with firewall, dynamic host configuration protocol (DHCP), domain name system (DNS), network address translation (NAT), and routing features.

In some examples, the system has been configured such that the device can report collected data to back end servers via multiple connectivity paths depending on what is available and the (lowest) cost of data transport available to the device to reach the back end server.

In certain embodiments, a device is provided for aggregating networks in a vehicle and serving data from those networks to remote computers, wherein the device includes external connectors to interface with the power, vehicle, antennas, networks, and peripherals that can be attached to the box.

In one example, the system may further comprise: a plurality of medical probe and sensor interfaces. Such components may be selected from the group consisting of: ultrasound, temperature sensor, blood pressure sensor, pulse oximeter, glucose sensor, and electrocardiogram (EKG). A software application capable of interpreting and processing the probe or sensor interface data may also be utilized.

The disclosed apparatus may be embodied in the form illustrated in the accompanying drawings, attention being called to the fact, however, that the drawings are illustrative of some examples, and that changes may be made in the specific construction illustrated and described within the scope of this application.

BRIEF DESCRIPTION OF THE DRAWINGS

Various other objects, features and attendant advantages of the disclosure will become fully appreciated as the same becomes better understood when considered in conjunction with the accompanying drawings, in which like reference characters designate the same or similar parts throughout the several views, and wherein:

FIGS. 7A and 7B, together, form a process flow chart showing screen layouts of video camera signals for buses; and, FIGS. 8A and 8B, together, form a process flow chart showing screen layouts of video camera signals for refuse trucks.

DESCRIPTION OF THE PREFERRED EMBODIMENTS

A. Overview

Figure 1:
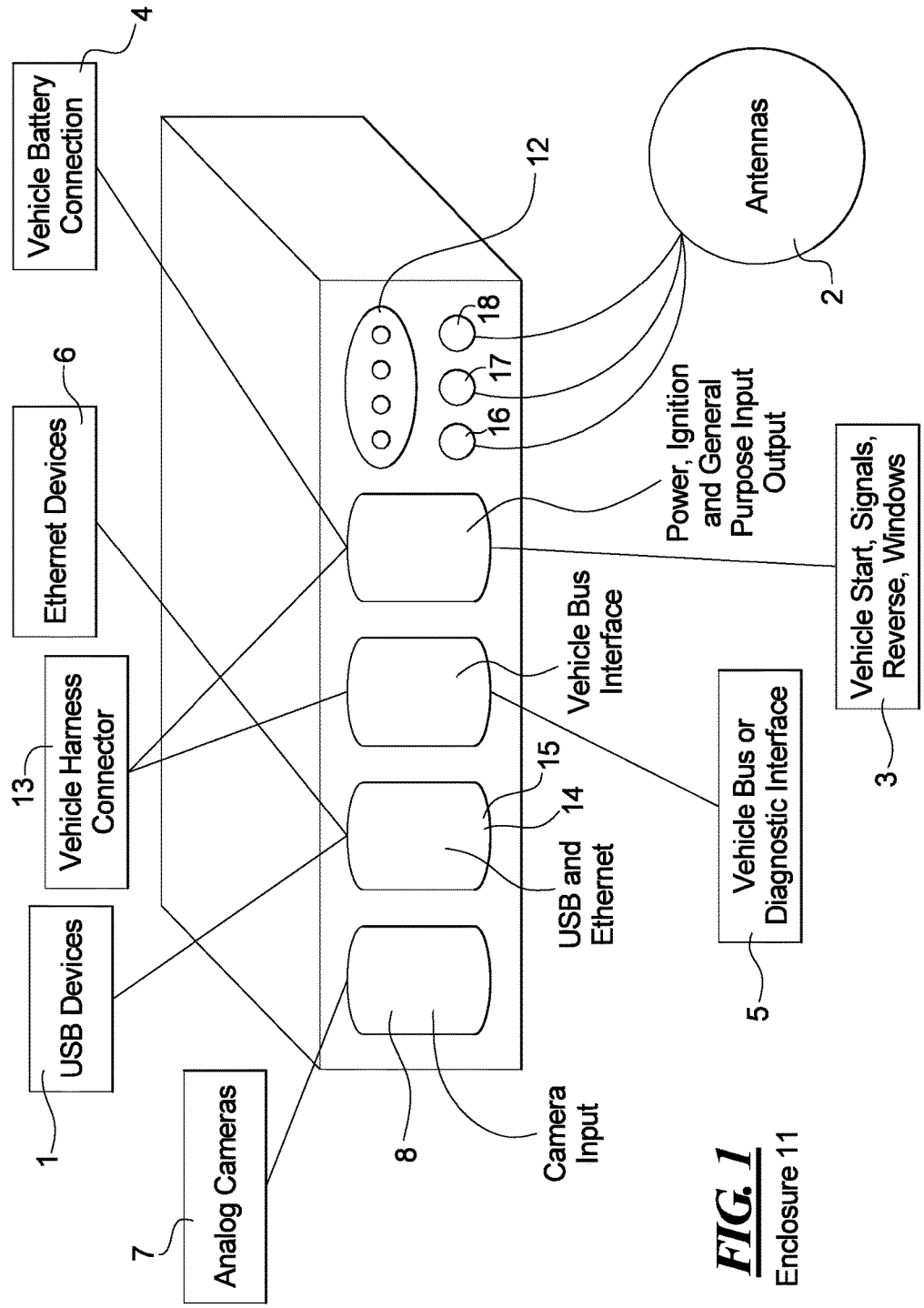
FIG. 1 is a diagrammatic illustration of one example of a vehicle computer system interfaced with multiple external peripherals, networks, and systems.

Turning now descriptively to the drawings, in which similar reference characters denote similar elements throughout the several views, the figures illustrate three main components, although other components and variants of these components could also be utilized. The first component, in one example, is a motherboard containing the electronics embodying the vehicle computer system. The second component is software which implements the instructions for the electronics enabling the functionality described herein. The third component, in this example, is a case to protect the motherboard and to provide a method of mounting the device in a vehicle.

B. Enclosure (Case)

In one example of the disclosed system, a case (or housing) is provided. The case 11 contains and protects the motherboard 20 (see FIG. 2) and other electronic components. The motherboard 20, which has software loaded on it, includes circuitry and memory with software. The case 11 protects the motherboard 20 from damage and provides a way for the vehicle computer system to be mounted in the vehicle.

The enclosure 11 provides appropriate containment, protection, mounting and possibly heat dissipation for the motherboard 20 for the in-vehicle computer system. The enclosure 11 may be sized according to the motherboard 20 and the features included on the motherboard 20. The enclosure 11 contains supports that the motherboard 20 rests on and contains the motherboard 20 securely when the enclosure 11 is fully assembled. The enclosure 11 should be created from material, such as 141 Polycarbonate, that is suitable for the automotive environment.

Protruding from the case 11 are the various connectors the system utilizes for the purpose of integrating with various systems and peripherals in the vehicle. The Vehicle Harness Connector 13 provides a connection point to the vehicle's power supply, diagnostics bus, and permits interfacing with vehicle systems that must be controlled by relay. Vehicle Harness Connector 13 encapsulates Vehicle Bus or Diagnostic Interface 5, Vehicle Start, Signals, Reverse and Windows 3, and Vehicle Battery Connection 4. The universal serial bus (USB) Port 14 is present to allow connection to a personal computer (PC) (e.g., for receiving a software update), or to attach USB peripherals 1 such as a mass storage device or sensors. The Ethernet Port 15 provides a connection to in-vehicle or on-vehicle Ethernet devices 6 such as IP cameras, etc. The Antenna Jack connectors 16, 17, 18 may be utilized for connecting various wireless communications structures (antennas 2) to the device in the event that the device does not have an antenna built into the motherboard 20. Status Indicators 12 are provided, in some examples, for diagnosing problems with the device in the event of malfunction of any component of the device or peripherals.

In the event that an Ingress Protection (IP) rated case requiring complete or nearly complete air-tight and moisture-tight features is required, there may not be enough thermal dissipation from the motherboard 20 to the environment. In this event, portions of the case may be made from aluminum or other sufficiently heat conducting material to facilitate thermal conduction. In most examples, it will be desired to utilize a material that is also rugged enough for the environment that the device will be deployed in. A thermal paste or equivalent can be used to thermally bond the central processing unit (CPU) 21 (see FIG. 2) to the Case 11 to dissipate that heat. Heat sinks or equivalents may also be employed.

C. Motherboard

Figure 2:
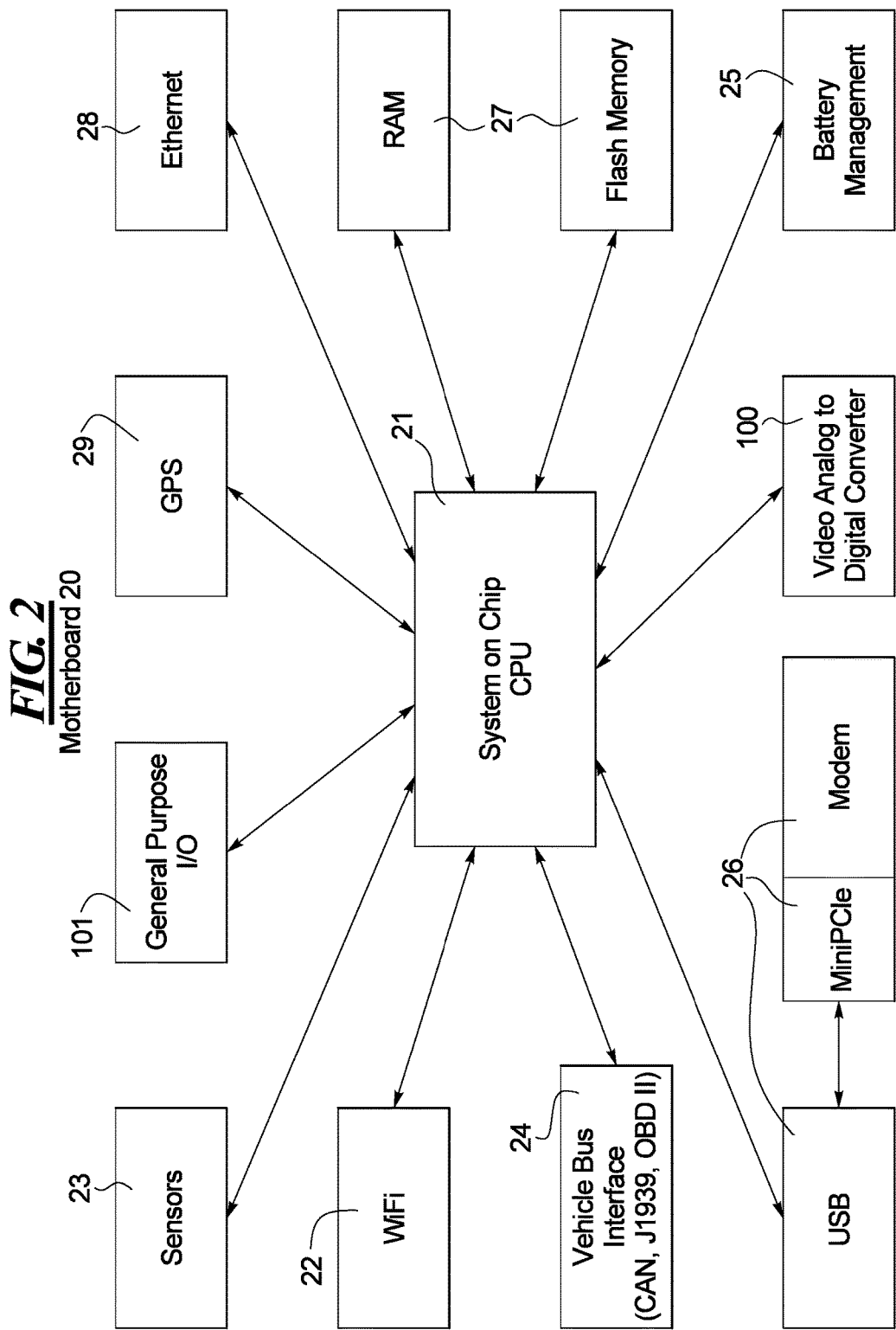
FIG. 2 is a block diagram according to one implementation of the hardware components involved in the disclosed system.

In one example, with reference to FIG. 2, the motherboard 20 may contain all of the electronics necessary for the vehicle computer system to run the software element to perform the functions enumerated herein.

The motherboard contains all of the circuitry for the in-vehicle computer system. At the heart of the motherboard is a System on Chip CPU 21 (such as the CSR ATLAS V™ or FREESCALE i.MX6 QUAD chips). This chip, in one example, provides the interfaces for all of the other chips that make up the system. The Memory 27 may be segmented into both random access memory (RAM) and Flash memory to provide data storage (or memory) for system operation, along with storage for software and data. The WiFi System 22 chipset typically connects via a secure digital input output (SDIO) (such as the CSR 6031™ multi-channel input multiplexer) and provides WiFi Client, WiFi Access Point and WiFi Direct functionality depending on the mode in which it is operating. This allows the device to serve both as an access point to serve data to devices, as a WiFi client to connect to other WiFi Access Points, or as a peer in a WiFi direct network.

The Sensors 23 may include an Accelerometer, Gyroscope, Magnetometer, Battery Voltage Meter, Thermometer, Input Voltage Meter, and General Purpose Input Output Sensor (GPIO's) 101. The sensors may also include a braking sensor, gear selector sensor, or other vehicle system sensor, operator activity sensor, or operating condition sensor. A GPS receiver may also be provided. These sensors are typically connected via Inter Integrated Circuit (I2C) on the CPU 21 or are integrated into the CPU 21. The Battery Management Subsystem 25 controls the charging of an optional battery and, in one example, allows the system to continue running when external power has been removed. The Battery Management Subsystem 25, in one example, allows for the device to detect and report power loss, and fully operate apart from being attached to vehicle power for as long as the battery is adequately charged. It should also be understood that the General Purpose I/O 101 is used to connect to discrete signal systems such as vehicle reverse indicator, vehicle brake light, vehicle turn signal, vehicle door pin switches to sense the state of such signals. The GPIO 101 can also drive relays to turn power to components on and off in the vehicle.

The Vehicle Interface 24, in one example, provides a standard interface for the Society of Automotive Engineers (SAE) On Board Diagnostics (OBD) II and SAE J1939 vehicle bus interface. It also works with standard Controller Area Network (CAN) buses. This interface can be further enhanced to support other serial bus interfaces. The vehicle interface 24 in one example is based on a chip like the OBD SOLUTIONS STN1110 or the ELM ELECTRONICS ELM327 interface chips. The chip connects to the CPU (21) via a high speed Universal Asynchronous Receiver/Transmitter (UART).

The Global Positioning System Receiver (GPS) 29 is either a discrete module provided by a GPS vendor like uBlox or CSR. The term GPS used herein to indicate a system for receiving an external surface or orbitally originating wireless signal and calculating a position relative to the origin of those same signals. In one example, the CPU 21 provides for a built in GPS (like the CSR ATLAS V chip) and, in this example, the GPS 29 may only be the additional electronics necessary to interface to the antenna. This GPS 29 interfaces to the CPU 21 via a UART or baseband interface. In another example, the GPS 29 may actually reside as a card in the MiniPCIe socket or integrated into the modem that is inserted into the MiniPCIe socket.

The Ethernet interface 28 provides a method for attaching the motherboard 20 to other Ethernet devices such as one or more video cameras or Institute of Electrical and Electronics Engineers (IEEE) 802.11p radio, or other custom network appliances. The Ethernet interface 28 may be used to connect to a computer device. In one example, the Ethernet interface connects to the CPU (21) via Secure Digital Input Output (SDIO) or Security Parameter Index (SPI).

The Modem Interface 26, in one example, is comprised of three subcomponents including a USB connector, a Miniature Peripheral Component Interconnect (MiniPCIe) connector that is connected to the USB connector and a modem module that inserts into the MiniPCIe connector. The Modem Interface 26 provides access to wireless networks, including, for example, a cellular 3G/4G network or other cellular network, Bluetooth Networks, Satellite Networks, or custom radio interfaces on licensed frequencies. The USB component of the Modem Interface 26, in one example, is separately utilized to allow other USB devices to be attached to the motherboard 20. The interface may comprise a USB connector, serial connector, parallel connector, RCA connector set, a LIGHTNING™ connector such as used for APPLE brand tablet computers, FIREWIRE™ connector, or other connector for connection to the computer device and/or for connection to an external storage device or other peripheral device.

The design of the motherboard 20 allows various subsystems to not have their parts populated when the motherboard 20 is built. The WiFi System 22, Sensors 23, Vehicle Interface 24, Battery portion of Battery Management 25, the Modem Interface 26, the Ethernet 28 and the GPS 29 can all be depopulated in any permutation and the remaining subsystems will work properly. One notable combination when this depopulation system may be used is when the Modem Interface 26 is populated with a modem that has a built in GPS or Assisted GPS (AGPS). In these cases, a customer may only want to use the GPS on the modem to save the cost and/or complexity of the dedicated GPS 29. A common cost-reduced configuration of the Motherboard 20 includes only subcomponents such as CPU 21, WiFi System 22, Vehicle Interface 24, Battery Management 25 (minus the actual battery) and Memory 27.

To support video capture the motherboard may include a video analog-to-digital conversion chip 100 (such as a TW6869 chip from Intersil) that allows, in certain embodiments, 4 to 8 cameras to be connected to the mother board. The conversion chip may connect to the System-on-Chip CPU via a PCIe interface. Alternate embodiments may connect the video analog-to-digital conversion chip 100 from other manufacturers to a MIPI CSI2 interface instead of the PCIe interface. Additionally, the System-on-Chip CPU of a preferred embodiment supports color space conversation features and H.264 compression features so that digital video data from the video analog-to-digital conversion chip 100 can be compressed, distributed and then presented on an attached computer system or recorded on a persistent storage device ether on the motherboard, attached to an expansion port on the motherboard, or on an attached computer system (using the storage on a tablet computer, for instance).

D. Video Capture Subsystem

The Video Capture Subsystem (see FIG. 5) of certain embodiments includes both a software component and a hardware component in the system which performs the functions necessary complete the video capture tasks enumerated in this application. The video capture subsystem may be connected to one or to a plurality of video cameras, including analog video cameras and/or digital video cameras. The cameras may be mounted on the vehicle, such as on the vehicle body and/or on or in vehicle mirrors or other accessories or components. The cameras may be directed forward, rearward, to the left side and to the right side of the vehicle. The cameras may include cameras directed to blind spots in the vehicle mirror system. The cameras may include one or more cameras directed toward the vehicle load and/or to vehicle components or systems. The cameras may be directed into the vehicle or mounted within the vehicle, such as within the passenger compartment of the vehicle.

The Video Capture Subsystem 119 of certain embodiments is comprised of two main component systems. The first component is a Video Encoding Unit 159, and the second component is the Computer Device 160, such as a tablet computer, smart phone, or other computer device. Video is captured and encoded by the Video Encoding Unit 159, is processed and then either stored in a Data File 132 on the video encoding unit or sent over a network connection via a USB Link 161 or a WiFi Link 162. In one embodiment, the processed video data may be sent over an Ethernet link 69 (see FIG. 4).

Figure 5:
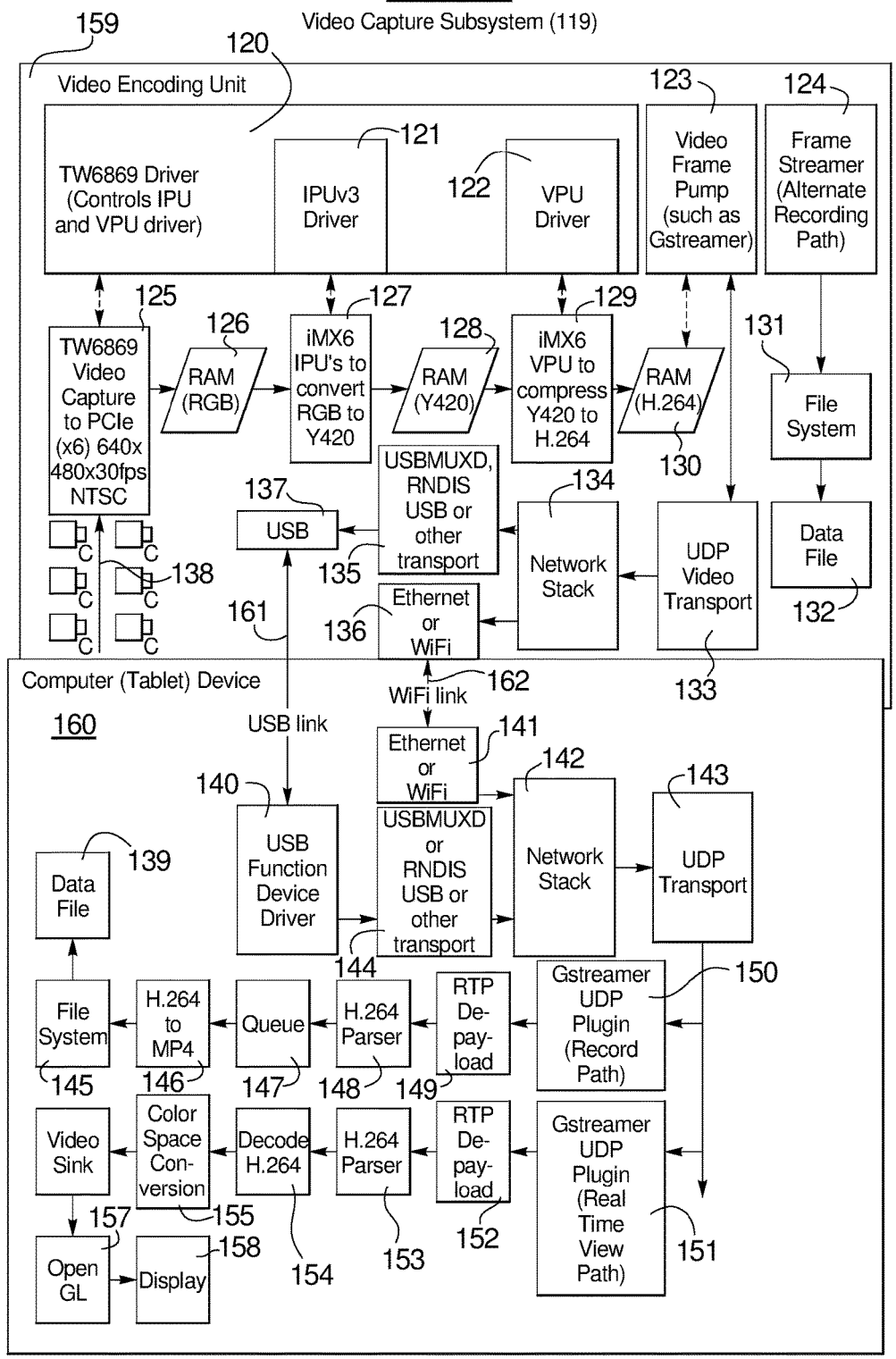
FIG. 5 is a diagram of a system that is operable to perform video capture, transformation, recording, and display.

As shown in FIG. 5, the Computer (Tablet) Device 160 then receives the video data (e.g., via the USB link or WiFi link), decodes the video data and either records the video data to a data file 139 and/or presents at least some channels of the video data on the display 158.

The time that it takes from the real life event detected by the cameras 138 to the time the video representation of that event appears on the display is referred to as the video lag. Because every 10 ms of video lag represents approximately 10 inches of movement in a vehicle travelling 60 mph, the reduction of video lag is imperative in certain embodiments. To reduce video lag in the system, processing of the video is broken down into several short steps that can be performed concurrently to reduce the video processing steps into a pipeline that reduces latency.

In certain embodiments, raw analog video data (for example in an NTSC format) is sent from multiple cameras 138, which may be 4 to 8 cameras (for example), to the TW6869 video capture chip 125 for capturing the video signals. The TW6869 video capture chip 125 directs its output to a buffer 126 that is read into the IMX6's IPU (Image processing unit) 127 for color space conversion which then directs its color space output via RAM 128 into the iMX6's VPU (Video processing unit) 129 for video compression. This process is controlled by a master driver 120 (e.g., TW6869 Driver) which coordinates the IPUv3 Driver 121 for image processing and the VPU Driver 122 for video processing. Once the video is output from the VPU 129 into RAM 130, it is picked up by a video frame pump 123 that broadcasts the video data over the network stack via a UDP video transport 133. It may also be sent to the file system 131 by a frame streamer 124 so that the video data frames are recorded into a data file 132.

Once the video frame data has been inserted in the network stack 134 via the UDP Video Transport 133, it is then sent out over a network connection such as Ethernet or WiFi 136 via the WiFi Link 162 or the Ethernet Link 69 or the video data is packed up (packetized) in a USB transport 135 and sent over USB 137 via the USB Link 161 to the Computer (Tablet) Device 160. Once the video data is received by the Computer (Tablet) Device 160, the video data proceeds through the USB Function Device Driver 140 and then through the USB Transport Driver 144, or the video data arrives through the Ethernet or WiFi 141. Next, the data is presented via the Network Stack 142 and then made available via the UDP Transport 143.

Once the video is available via the UDP Transport 143 it may be picked up by the GStreamer UDP Plugin 151 for configuring the multimedia framework protocol, passed to the RTP Depayload 152 for removal of the payload data from the headers in the RTP (real time transport protocol) stream, then to the H.264 Parser 153 for parsing of the data, followed by the Decode H.264 154 for decoding of the data, then to the Color Space Conversion component 155 for generation of the color channel signals, then the Video Sink 156, and finally sent to OpenGL API 157 for graphical display, causing the video to appear on the display 158. Additionally or alternatively, the video could be recorded through a similar path which includes GStreamer UDP Plugin 150, RTP Depayload 149 and H.264 Parser 148 (corresponding with items 151, 152 and 153, respectively). However, instead of going through Decode H.264 154, the video data is passed through a Queue 147, and then to an H.264-to-MP4 converter 146 for conversion of the video data into an MP4 file, which is sent to the file system 145 for storage, where it is stored as a data file 139.

The video data is thereby displayed to the driver as needed and is stored for later retrieval. The stored data may be recorded as first in-first out (FIFO) data so that the more recent data replaces older data. A triggering event in the vehicle systems, such as a hard braking action, may mark a video segment for ready reference and may mark a video segment for more permanent storage.

C. Operating System Software and Device Drivers

The software provides the instructions for the processor and the Motherboard to enable the processor to perform the tasks enumerated in this application.

The core operating system 33 for certain embodiments, in one example, is MICROSOFT WINDOWS CE 6 operating system. In other examples, the core operating system may be QNX, LINUX or ANDROID operating system software. At the lowest level of the Operating System Software and Device Drivers 30 is the Hardware Abstraction Layer 31. This Hardware Abstraction Layer 31 contains components for operating the hardware during boot time, during interrupt handling, during lowest power operating modes, and during critical system failures. While this Hardware Abstraction Layer 31 interacts with the operating system, the Hardware Abstraction Layer 31 may not require the operating system in order to perform its functions. The Hardware Abstraction Layer 31, in one example, is a key part of fault tolerance and recovery in the system. In one example, the Hardware Abstraction Layer 31 includes system timekeeping, power management, CPU configuration, event logging and low level diagnostics for post-failure analysis. This Hardware Abstraction Layer 31 also utilizes a formal Application Programming Interface (API), which is exposed to Device Drivers 32 for interrupt handling.

Device Drivers 32, in one example of the system, handle all the various devices in the system, including physical devices and virtual devices. In this layer, the driver interfaces for Sensors 23, Vehicle Interface 24, Ethernet 28, and GPS 29 exist. The Power Handler 34, in one example, manages power and battery charging in the system. The Power Handler 34 may also be responsible for determining the current power state of the system and for adjusting the current power state as necessary relative to the power state that the application software 40 may be requesting. The Power Handler 34 may also be responsible for addressing emergent situations such as sudden external power loss, battery failure, and temperature conditions.

The Over the Air Update Support 35 operates alongside the components in the Operating System Software and Device Drivers 30 to facilitate the secure download, installation, and rollback of software updates for the in-vehicle computer system and the devices attached to it, such as the Vehicle Interface 24 or the Modem Interface 26. The Over the Air Update Support 35 may be capable of running the Motherboard 20 hardware to facilitate upgrade of the Operating System Software and Device Drivers 30.

The Modem Handler 36, in one example, is a software stack for operating various 3G or 4G cellular modems that connect via the Modem Interface 26 to the device. The Modem Handler 36 detects the type of modem installed and configures itself to run in the mode necessary to operate the modem correctly.

The WiFi Handler 37, in one example, is a software stack and API that is capable of running the WiFi System 22 in WiFi Client, WiFi Access Point or WiFi Direct mode depending on the requests of the Application Software 40. The WiFi Handler 37 may automatically configure most WiFi parameters requiring that the Application Software 40 only provide a security key and Service Set Identification (SSID) to create a connection.

The Video Capture 38 component is responsible in certain embodiments for implementing the Video Encoding Unit 159 stack described in FIG. 5—Video Capture Subsystem 119. The Video Capture 38 includes control API's that are operable for turning the video on and off, choosing cameras, configuring frame rates, and scaling.

The video display may be dynamically changed to show the video information from a single camera or from multiple cameras. The video display is not limited to certain predefined monitor formats and/or orientations, but rather can be programmatically changed to display in any orientation, any combination of cameras in any screen layout deemed desirable, with flexible scaling, cropping, and positioning of the on-screen images.

The video display may include labels shown with the video data to indicate to the user the location and orientation of the different camera views. The labels may be text or representative symbols. The labels may be used at every occasion while using the video system or the labels may be turned on and off depending on the needs of the user.

The display portion of the tablet computer or other computer device may show information and output data from the sensors on or about the vehicle. For example, the display may show the accelerometer output, the turn signal indicator, the braking sensor, or other sensor information on the screen of the tablet computer. The display may indicate the status of the cameras so that a camera that has failed may be detected and serviced even if the failed camera is one that would not be actively displaying video data to the user during a vehicle operating condition. For example, the driver may determine from the status indicator that the right side camera is not operating before the driver discovers that the camera has failed during a lane change maneuver.

In certain embodiments, the display includes a representation of the vehicle, such as a vertical bar or other visual element to represent a truck or other vehicle. Video data from the video cameras is displayed at locations relative to the representation to enable the user to quickly determine a camera view orientation and direction that thereby see a near real time view of the area surrounding the vehicle, as well as views to the horizon, and possibly views of and/or within the vehicle.

The recorded video can be played back on the computer device so that the user may view video of an event. The displayed recorded video may be presented in the same format and with the same number of channels as displayed to the driver when the video stream was being obtained, or other video channels may be displayed including display of all video channels either simultaneously or sequentially.

To support the flexible configuration of the Motherboard 20, the Operating System Software and Device Drivers 30 may provide device detection during initialization. In this example, if a peripheral device (sensor, etc.) is not present, the device driver is not loaded for that peripheral device. If the peripheral device is present, the associated driver is loaded. Additional device drivers 32 could be added to this configuration to support additional devices being supported via USB on the Modem Interface 26 or additional Sensors 23.

D. Application Software

The software utilizes a user interface and may perform the business logic required for any given deployment of the disclosed system and device.

The Application Software 40 may comprise an API layer that provides a structured method for Application Software 40 to access complex data. The Application Software 40, in one example, also comprises a server layer that collects the data from the API layer. Primarily, this server layer is made up of the WebSockets 44 and the Web Server 45. In one example, the Application Software 40 is provided as a Web Application 46 or a Service Provider Application 47 resident on the motherboard 20 to eliminate the need for software to be installed on the remote computing device.

The Vehicle Bus API 41, in one example, collects data from the Device Drivers 32 which share data with the Vehicle Interface 24 and interprets the data to a format that can be accepted by the Web Sockets 44. The Vehicle Bus API 41 can also accept data from the WebSockets 44, validate the legitimacy of the data, and then communicate the data to the Device Drivers 32, which then gets communicated to the Vehicle Interface 24, such that components on the Vehicle Bus can be controlled through the HTML5 applications. Examples of components which may be controlled in this manner include: vehicle headlamps, door locks, and engine start.

The Sensor API 42, in one example, collects data from the Device Drivers 32 (which exchange data with the Sensors 23) and interprets the data into a form that can be accepted by the WebSockets 44. The Sensor API 42, in one example, can also accept data from the WebSockets 44, validate the legitimacy of the data, and then communicate the interpreted data to the Device Drivers 32. The data may then be communicated to the Sensors 23.

The Location API 48, in one example, collects data from the Device Drivers 32 which communicates with the GPS 29 and interprets the data into a form that can be accepted by the WebSockets 44. The Location API 48 can also take data from the WebSockets 44, validate the legitimacy of the data, and then communicate the interpreted data to the Device Drivers 32. The data may then be communicated to the GPS 29.

The Short Term Data Store 43 is used by the following components: Device Drivers 32, Power Handler 34, Over the Air Update 35, Modem Handler 36, WiFi Handler 37, Vehicle Bus API 41, Sensor API 42, Service Provider Application 47, and Location API 48, to keep a copy of the last reported value of any particular data element. This copy of the last known good value can then be communicated by WebSockets 44 or directly accessed by the Service Provider Application 47.

The WebSockets 44, in one example, are used to publish data to HTML5 Web Applications 46 communicated by the Web Server 45 or to publish data to the Service Provider Application 47. The WebSockets 44 may also be used by HTML5 Web Applications 46 or Service Provider Application 47 to send data to various subsystems, but does not provide uncontrolled access to those subsystems. The WebSocket layer provides data collected by the device in a normalized format using text naming conventions to allow a standardized way to access available data on the device without regard to the data's actual origin. The WebSockets 44 can also provide an input/output path to devices connected to the Modem Interface 26 via the Modem Handler 36, the Ethernet 28 via the Device Drivers 32, or the WiFi System 22 via the WiFi Handler 37. Power Management can also be performed in limited ways with WebSockets 44 through the Power Handler 34.

The Web Server 45 may be a web server that is compliant with internet standards and also supports ISAPI extensions. The Web Server 45 in one form is capable of meeting the requirements for full HTML5/CSS3/JavaScript support for WebApps. The Web Server 45 communicates files to a requestor on the network connected to the Motherboard 20 via WiFi System 22, Ethernet 28 or Modem Interface 26.

The Web Application 46 may be hosted by the Web Server 45. In one form, the Web Application 46 is delivered to the requesting device, typically a (portable) smart device, which is connected via WiFi System 22. This application may implement the user interface to the in-vehicle computer system. One or more Web Applications 46 can be present on the system and one or more requesting device(s) can be supported at a time. A very powerful feature of Web Applications is that such Web Applications operate across multiple platforms, which helps eliminate compatibility problems and device version problems.

The Service Provider Application 47 may implement the business logic of the system to provide functionality such as connecting to back end servers, synthesizing or processing data from the various interfaces and then reporting the processed data, logging the processed data, or trigging an event from processed or raw data. A typical example would be for Automatic Vehicle Location system wherein the Service Provider Application 47 would track the location of the vehicle by using the Location API 48, processing that information into a form that a remote server may request, and then reporting the location of the vehicle via the Modem Handler 36 or equivalent subsystem. In one example, the Service Provider Application would repeat location system/routing on a repeating schedule, such as for example every 5 minutes. In one form, the locating and reporting subsystem may be disabled for example when the vehicle was turned off. In other examples, the reporting subsystem may operate on an interactive schedule such as when the vehicle is not operating, in which case the reporting subsystem would report the vehicle location, for example, every hour.

A number of Web Applications 46 or varying degrees of sophistication of the Service Provider Application 47 can be created. In some examples, more than one Service Provider Application 47 may be present. In addition, the Service Provider Application may be written in a programming language supported by the target operating system. Also, the Service Provider Application can access varying Operating System 33 API's directly instead of using WebSockets 44 if a data element or service not provided by WebSockets 44 is necessary.

Further, smart devices that are connected via WiFi System 22, Ethernet Interface 28 or the Modem Interface 26 may comprise dedicated applications on them that directly use the WebSockets 44 interface without using a Web Application 26.

E. Connections of Main Elements and Sub-Elements of the Disclosed System and Device The Application Software 40 is stored in the Persistent Storage (such as Flash Memory) of the device and hosted by the Operating System Software, Services, and Device Drivers 30. Each of the Application Software, Operating System Software, and Device Drivers are installed on the Motherboard 20 which is inserted in the Case (or Enclosure) 11. A remote computer or local computer may then access the Application Software remotely, and display an output of the data to the user or the data may be accessed by a local computer such as a tablet computer or smart phone or other computer device. The remote computer may also comprise a user input peripheral such as a touch screen, keyboard, mouse etc. for navigating the Application Software, selecting and manipulating the data display, and inputting commands and data. The computer device may include a portable computer device, stationary computer device (to which the system is connected while the vehicle is stationary), desktop computer, kiosk computer, laptop computer, netbook computer, notebook computer, workstation computer, server computer, smart phone, PDA, e-reader device, or other computer device. Connections between the computer and the system may include an internet connection, network connection, WAN, LAN, wireless connection, cellular connection or other wired or wireless connection.

Figure 3:
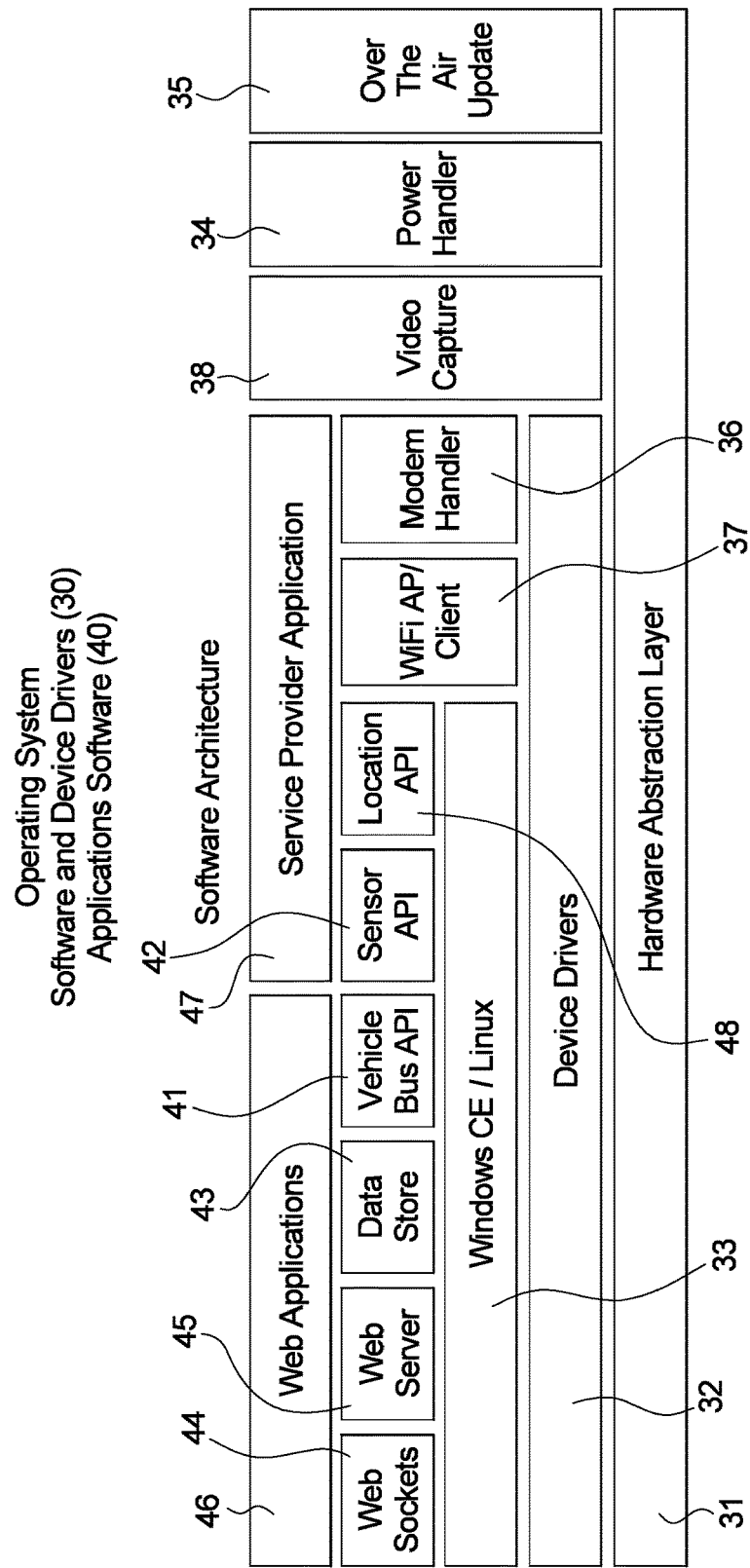
FIG. 3 is a block diagram of vehicle computer system software according to one example of the disclosed system.

Reference is made to FIG. 3, which shows details of how the software of one example is arranged from a logic block perspective. Additionally, reference is made to FIG. 4 to understand how data flows through the various software subsystems to and from the Application Software 40.

F. Alternative Embodiments of the Disclosed System and Device

Possible alternative variants of this disclosed system and device include:

1) A Kiosk connectivity box that provides the CPU 21, Battery Management 25, Modem Interface 26 and Ethernet Subsystem 28 with associated Operating System And Device Drivers 30 with application software necessary to maintain a network connection if faults occur. Each of these components may be conveniently provided in one Enclosure 11.

2) A Vending Machine Connectivity Box that provides the CPU 21, Battery Management 25, Modem Interface 26 and CAN interface from the Vehicle Interface 24 with associated Operating System and Device Drivers 30 and Service Provider Application 47. In this example, the Service Provider Application 47 may provide an internet connection to the vending machine for clearing credit card transactions and may communicate with the vending machines hardware over CAN. Again, each of these components may be conveniently provided in one Enclosure 11.

3) An in-vehicle WiFi Access Point that includes CPU 21, WiFi System 22, Battery Management 25, Modem Interface 26, the Operating System Software and Device Drivers 30 to function as a wireless access point. In one example, all of these components are provided within one convenient Enclosure 11.

4) A medical probe wireless docking station that provides the CPU 21, Battery Management 25, WiFi System 22, and CAN interface from the Vehicle Interface 24 with associated Operating System and Device Drivers 30 and Service Provider Application 47 that allows medical probes to be plugged in to the CAN or USB bus interface and have the probe data processed by the Service Provider Application and made visible through a user interface presented via HTML5 and WebSockets to smart devices that attach via WiFi. This docking station, in one example, communicates securely with the medical data server via WiFi. In one example, patient medical data is stored on the secure medical data server rather than on the smart device.

G. Operation of a Preferred Embodiment

Figure 4:
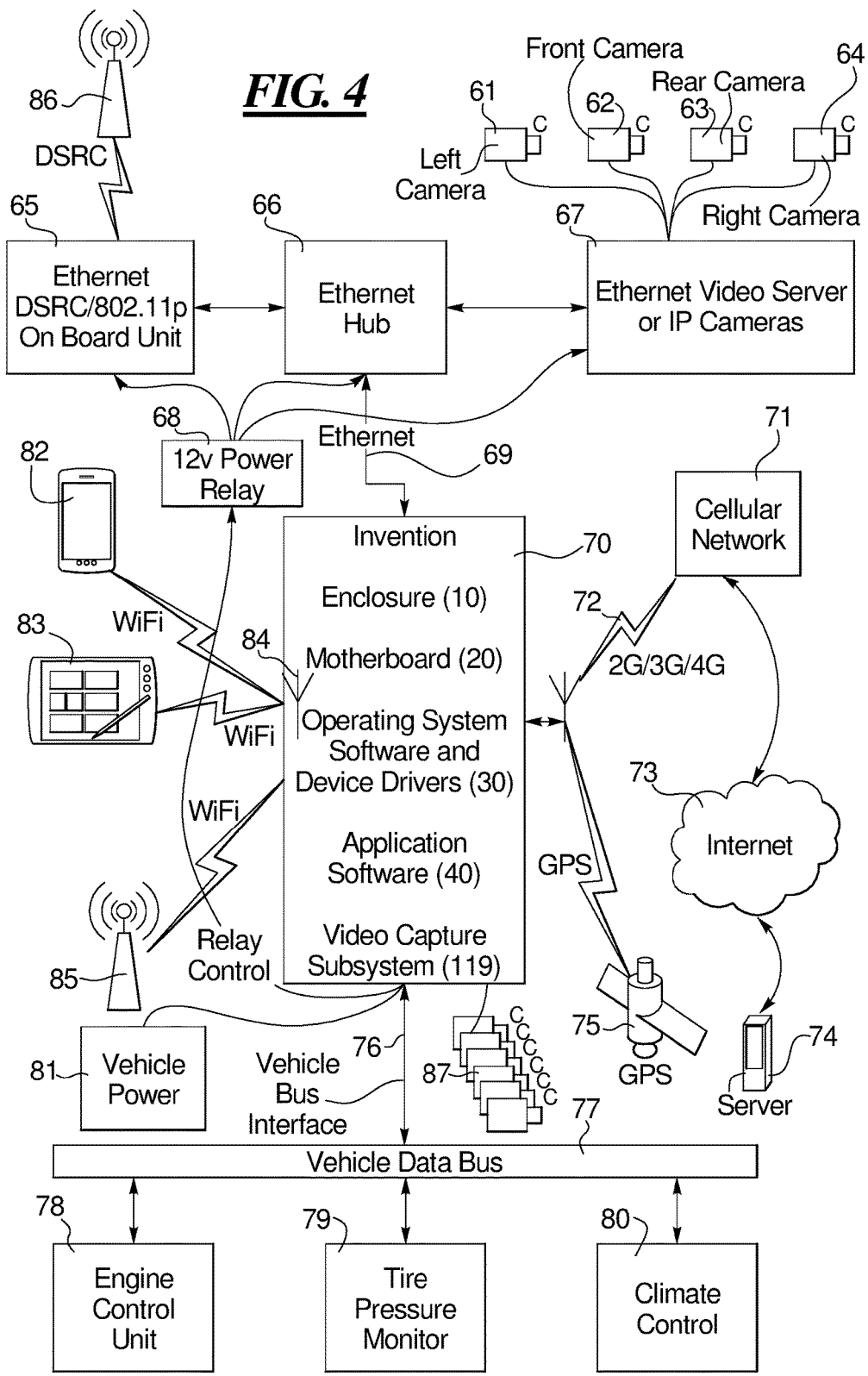
FIG. 4 is a diagram showing one example of the disclosed system.

Reference is made to FIG. 4 for a visual illustration of the operation of the disclosed system and device in one example.

The information hub 70 brings together unrelated systems on the vehicle into a format that can be used for information, entertainment, diagnostics, data collection and control. Each unrelated subsystem is detailed below.

Vehicle Data Bus 77:

Through the vehicle bus interface 76, data is collected from various devices on the vehicle data bus 77 such as the Engine Control Unit 78, the Tire Pressure Monitor 79 and the climate control unit 80. The vehicle bus interface 76, in one example, is connected via the Vehicle Harness Connector 13 to the Vehicle Interface 24. The Vehicle Interface 24 is operated by the Device Drivers 32, which in turn exposes the information from the devices on the Vehicle Data Bus 77 via the Vehicle Bus API 41. The Vehicle Bus API 41 then publishes the information through the Short Term Data Store 43. Here the data is normalized so that the WebSockets 44 can receive and interpret the data. If a remote computing device such as a tablet computer 83 or smart phone 82 is attached via WiFi System 84 or WiFi System 22 or by a wired connection to the information hub 70 and running a Web Application 46, the WebSockets 44 may then provide the information from the Short Term Data Store 43 to the Web Application 46.

Through the Ethernet Interface 28 and Ethernet Network, one or more Ethernet devices (65, 66, and 67) may be connected to the Information Hub 70. In this embodiment, a Dedicated Short Range Communication Unit 65 supporting 802.11p is connected to an Ethernet hub 66. Also, an Ethernet video server 67 may be connected to the Ethernet hub 66. Several cameras may be connected to the Ethernet hub 66 via the Ethernet Video Server 67 such as for example: Left Rear View Camera 61, Front View Camera 62, Rear Facing Camera 63, and Right Rear View Camera 64.

The DSRC/802.11p unit 65 (or equivalent) routes specialized data to and from other vehicles and Department of Transportation Road Side Unit 86. In one example, the traffic data is communicated by in the Service Provider Application 47, Video Encoding Unit 159, or Web Application 46 on a computing device such as smart phone 82 or tablet computer 83. In one example, the DSRC/802.11p unit 65 (or equivalent) can route regular network traffic such as Web Applications 46 from the Information Hub 70, through the Ethernet Interface 28, which is handled by the network device drivers 32 and passed to other devices communicating with the DSRC/802.11p unit 65.

The Ethernet video server 67, in one example, streams (communicates) video over the Ethernet to the Information Hub 70 through the Ethernet Hub 66. This video stream may then be received by the Device Drivers 32. The Device Drivers 32 operate the network, and the video stream may then be routed to any Web Application 46 that is requesting the video stream. An alternate example would be to integrate the video server 67 onto the motherboard 20 for direct video connection to the device as described in Video Subsystem 40. Another alternate example provides IP Cameras which integrate the camera into the video server and plug directly into the Ethernet Hub 66.

The Video Subsystem 40, in one example, streams video from, for example 4 to 8 cameras 87 (although other numbers of cameras are also possible) over the USB 1, the WiFi 84, Ethernet 69 or even over the Cellular Link 72 to a Phone 82, Tablet 83, Access Point 85, or Server 74. This may be a distinctly different subsystem from Ethernet Video Server 67.

The modem handler 36, in one example, shares the modem interface 26 connection to the 3G/4G 72 network (or equivalent), via the Modem Antenna Jack 18, with any Application Software 40 wishing to send data outside the internal network of the Information Hub 70. The Modem Handler 36 also allows network traffic from the WiFi System 22 or Ethernet Network 28 to be sent out the Modem Interface 26 using Network Address Translation technology in the Core Operating System 33. Through the Modem Interface 26, data can be sent to the cellular network 71 then, if desired, to the Internet 73 and, finally, to an off-board server 74. The Information Hub 70, on behalf of the Service Provider Application 47 or a Web Application 46, in one example, can also query an Off-Board Server 74 to query instructions for actions that the application software 40 should follow. Communications between the Information Hub 70 and Off-Board Server 74 may include Over the Air Update Support 35 as well. Lastly, Web Applications 46 may be accessed remotely over the Internet 73 through the Cellular Network 71, through the Modem Interface 26, through the Modem Handler 36, to the Device Drivers 33, to the Web Server 45. In one example, the Modem Interface 26 may also have GPS information programmed thereon via AGPS or some other mechanism. This global position information, in one example, can be communicated via the Location API 48 or by using the GPS built into the motherboard 29.

The WiFi System 22 in one example works in three different modes or in a combination thereof:

In Access Point mode, WiFi Access Point 22 serves as a wireless access point to which to attach any WiFi compliant device, such as a tablet computer 83 or smart phone 82. This mode provides the attached devices with access to the Web Applications 46, Video Encoding Unit 159, the Internet 73, or devices on the Ethernet 28, for example, the Dedicated Short-Range Communications (DSRC) 65 or Ethernet Video Server 67. This Access Point Mode also allows devices to access other devices attached to WiFi.

In Client Mode, the WiFi System 22 connects to nearby Access Points 85 to which the WiFi System 22 is authorized to be connected. This client Mode allows the Service Provider Application 47 to upload and download information (data) over a WiFi System 22 or may also provide a connection to the Internet 73 through the Access Point 85. This system, in one example, would be ideal for a fleet yard, where vehicles were parked, allowing them to cost-effectively communicate information collected and to download software updates, for example, via Over The Air Update Support 35.

In WiFi Direct Mode, the WiFi system 22 can provide wireless access point functions for a WiFi Direct compliant device such as a tablet computer 83 while also connecting to and sharing data with other WiFi devices such as WiFi Displays, WiFi Speakers or other WiFi Access Points 85.

Devices connected to the WiFi system 22, in one example, can route network traffic across Ethernet 28 connected devices and Modem Interface 26 connected systems. WiFi system 22, in one example, utilizes radio signals sent through the WiFi Antenna Jack 17 or an integrated antenna in WiFi 22.

The GPS 29 subsystem, in one example, reports information through the Device Drivers 32 and up to the Location API 48. The GPS data in one example is then normalized and posted to the Short Term Data Store 43 where the normalized data is provided to WebSockets 44 and ultimately accepted by either a Web Application 46 or Service Provider Application 47. GPS 29 receives GPS data through GPS Antenna Jack 16.

The Sensors interface collects a number of different types of sensors 23 together under a single interface, the Sensor API 42. These sensors include an Accelerometer, Gyroscope, Magnetometer, Battery Voltage, Input Voltage, Internal Temperature, Battery Temperature, General Purpose Output, General Purpose Input. This information can be used to determine what is going on with the vehicle from an inertial standpoint. It can also be used to determine if the operating conditions are within specification or not. Systems or mechanisms may also be provided for user direct input, so as to log health, sleep, stops, fueling, etc. such as by way of a touchscreen, keyboard, mouse, or other user input terminal.

This information is utilized via WebSockets 46 and the Service Provider Application 47.

The Power Handler 34 interface allows for detailed control of the power usage of the device. In one example, each major block of the Motherboard 20 can be powered on, off, and variants thereof using this Power Handler 34 interface. Power conditions, in one example, are communicated to the Power Handler 34 using the Short Term Data Store 43 and made available via WebSockets 44 or through the Operating System 33 API's directly.

In the disclosed system and device described herein several scenarios can take place including, but not limited to:

A remote and portable computing device, such as a tablet computer 83 or smart phone 82, may be connected via WiFi System 84 or WiFi system 22 to, for example, the Information Hub 70. The portable computing devices, in one example, access the Web Server 45, which then communicates a Web Application 46 to the remote computing device. The Web Application 46 then displays instrumentation for the vehicle on a display screen of the remote computing device. The Web Application 46 communicates with the WebSockets 44 to retrieve data for instrumentation and communicate this data to the display screen. The WebSockets, in one example, queries the Short Term Data Store 43 which keeps the last reported values of the data to be used for the instrumentation. The Vehicle Interface 24, in one example, receives data from the Vehicle Data Bus 77, passes the data to the Device Drivers 32, which then passes the data to the Vehicle Bus API 41 for processing (decomposition). The data may then be reported to the Short Term Data Store 43 to be communicated to the WebSockets 44 when the value is requested. The Service Provider Application 47 may be configured to detect a diagnostic trouble code communicated by the Vehicle Bus API 41 and may, upon such detection, generate a report (alert) to send to a fleet management server. The report may be routed through the Network Device Drivers 32, through to the Modem Handler 36, through the cellular network 71, to the Internet 73 and further communicated to the fleet server 74. The fleet server 74 may request information regarding the vehicle (global) position and inertial data (movement). The Service Provider Application 47 may also be configured to call the Location API 48 and Sensor API 42 to collect the required information (data). The information is then communicated, in one example, via the Modem Interface 26 to the server 74.

In one example, when the vehicle enters the fleet yard and it is turned off, the Service Provider Application 47 may be configured to sense the need to turn off the information hub and may call the Power Handler to turn off, at least, a portion of the information hub 70. The Service Provider Application 47 may then signal the relay 68 to turn off the power to one or more of the devices on the Ethernet 69, which may include the DSRC/802.11p 65 chip, Ethernet Hub 66 and/or Ethernet Video Server 67. The WiFi System 22 may then be switched from Access Point Mode to Client Mode and it connects to the Access Point 85 in the fleet depot area.

Complete diagnostic information may be collected using the Vehicle Bus API 41 by the Service Provider Application 47 and sent to the server 74 via the WiFi system 22 Access Point 85 connection. The unit then fully powers off via the Power Handler 34.

Vehicle component control information can be requested by the HTML5 application via WebSockets. The WebSockets may then request the Service Provider Application 47 to send control codes across the Vehicle Bus API 41 to interact with components in the vehicle such as door locks, compartment or driving lights or engine control (ignition). Alternatively, the Service Provider Application 47 may send control codes across the Ethernet or WiFi to other devices to control these or equivalent components.

In at least one example, vehicle data and medical data may be received and aggregated by a single device or system. Such a combination has particular application to ambulances, not only ground, but air and water as well, where vehicle data and patient data may be collected.

H. Video Display Layout

Figure 6A:
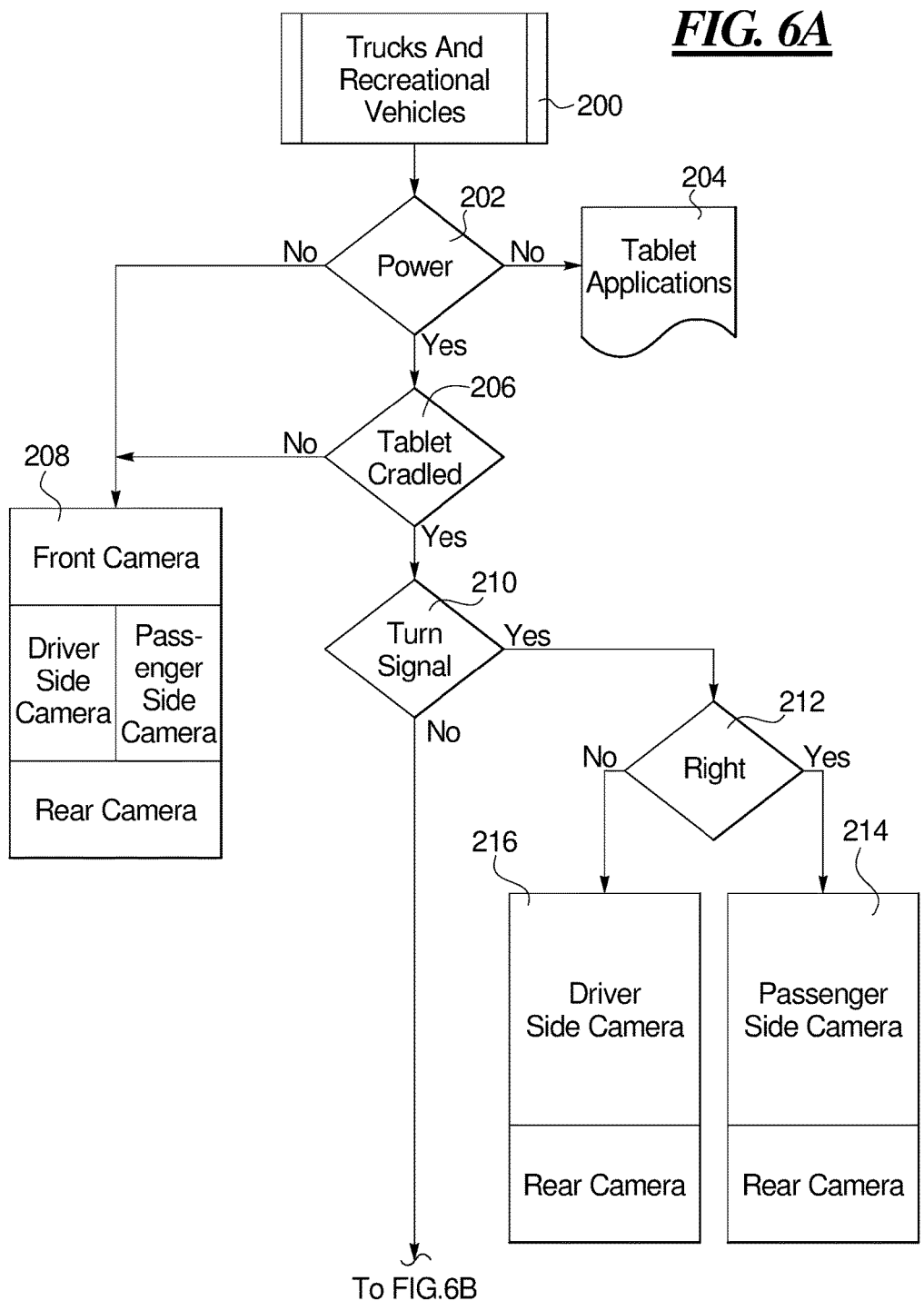
FIGS. 6A and 6B, together, form a process flow chart showing screen layouts of video camera signals for trucks and recreational vehicles.
Figure 6B:
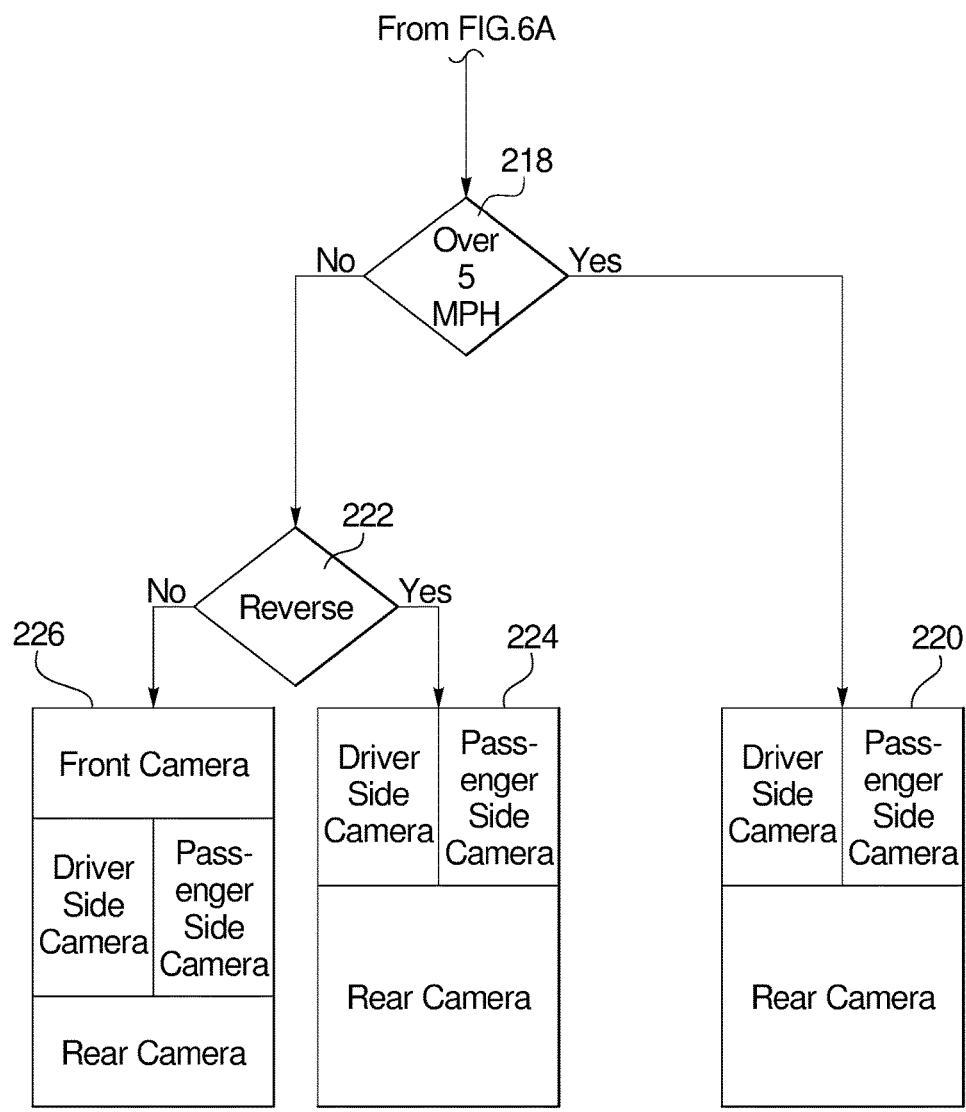

Referring to FIGS. 6A and 6B, the video data from vehicle mounted cameras may be shown on a tablet computer or other display device mounted in the vehicle within view of the driver. The vehicle of FIGS. 6A and 6B is a truck or recreational vehicle (RV) having four cameras that are directed to provide views of the area surrounding the vehicle and include a front facing camera, a rear facing camera, a driver side facing camera and a passenger side facing camera. The cameras may be mounted on the body of the vehicle, within the vehicle body, within mirror assemblies, or at other parts of the vehicle. The tablet computer or other computer device displays the video signal of several of the cameras at the same time in a layout on the display screen. The user may select from a number of possible screen layouts or the screen layouts may be preprogrammed into the tablet computer or other computer device.

If the user selects the truck and RV screen layouts 200, the computer device determines whether external power is supplied to the computer device, at 202. The computer device accesses tablet applications at 204. If external power is connected to the computer device at 202, an inquiry is made as to whether the computer device is mounted in a cradle, such as a docking station in the vehicle, at 206. The computer device generates a display as shown at 208 that displays the video of the front facing camera across the top of the screen, the video of the rear facing camera across the bottom of the screen, the driver side camera video at the middle left portion of the screen and the passenger side camera video at the middle right portion of the screen. The video layout is thus arranged as if the vehicle is in the middle of the screen, with the views of the surrounding road and area arranged as described. This layout is displayed when the camera device is not connected to external power nor cradled in the docking station.

If external power is connected and the computer device is docked, the system determines at 210 whether the turn signal of the vehicle has been activated. If so, the system determines which turn signal is activated, at 212. If the right turn signal is active, the layout of the video display is changed to a display 214 to provide a large view of the right side, or passenger side, camera and a smaller view of the rear camera. The front facing and driver side camera signals are not shown. If the left turn signal is active, the video display is changed to a display 216, which provides a large view of the driver side camera video signal and a small view of the rear camera video. The driver is thereby provided with an enhanced view of the side to which the vehicle is turning or of the lane into which the vehicle is changing lanes.

If the turn signal is not on at 210, the system determines at 218 if the vehicle is traveling at speed. For example, a 5 mph threshold may be provided. For a detected vehicle speed over 5 mph, in this example, the display layout 220 is selected, which has large views of the driver side video and passenger side video as well as a large view of the rear facing video, for example by dividing the screen approximately into thirds with the driver side to the left and passenger side view to the right. No front view video is shown.

If it is determined at 218 that the vehicle has less than 5 mph of forward motion, a determination is made at 222 as to whether the vehicle is in reverse. If so, the display layout 224 is shown, which has eliminated the front view video, maintains the small driver side and passenger side views in a position at the top of the display, and shows a large rear view video. If the system determines that the vehicle is not in reverse at 222 and is not moving more than 5 mph, the display layout 226 is shown. This layout 226 corresponds to the layout 208, with one third of the view being the front facing camera, one third being the rear facing camera and the middle third being split between the driver side and passenger side cameras. Of course, it is possible for more or fewer cameras to be provided on a truck or RV and for other display layouts to be provided.

Figure 7B:
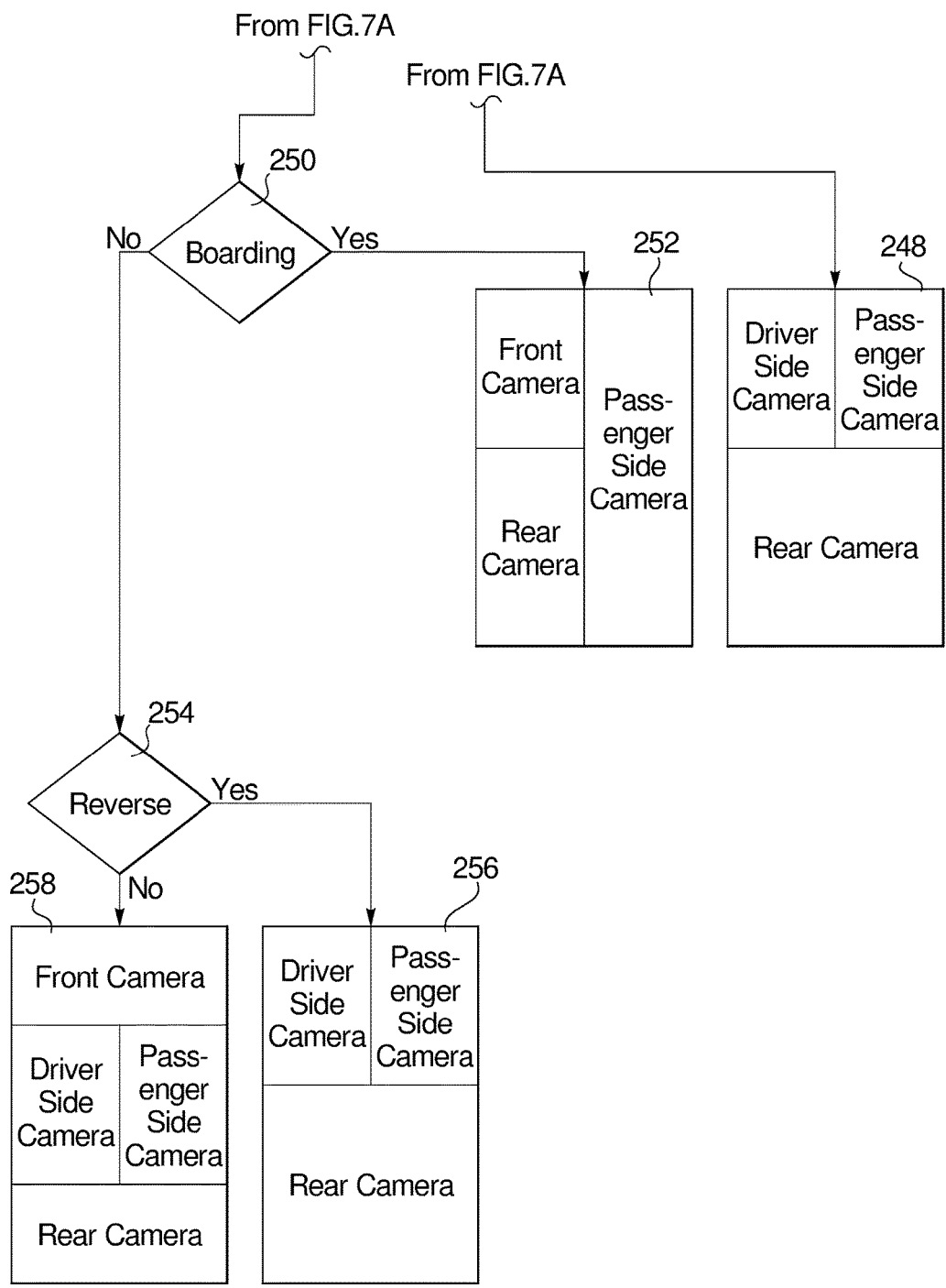

Together, FIGS. 7A and 7B, provide a set of display layouts for use on a bus, shuttle, trolley or other passenger carrying vehicle. A bus selection is made by the user at 228. Tablet applications are accessed at 230. If external power is not supplied at 232 or the tablet computer device is not cradled in docking station at 234, the display layout 236 is shown. One third of the view is the front facing camera, one third is the rear facing camera, and the middle third is split between the driver side and passenger side cameras, similar to the layout used for a truck. In a similar manner, activation of the turn signal at 238 results in a larger view (two thirds of the display) of the passenger side camera in the layout 240 for a right turn signal 242 and a larger view of the driver side at 244 for a left turn signal. As noted above, movement of the vehicle in excess of a threshold speed 246 activates the display layout 248 with substantially equal space dedicated to the rear camera and the two side cameras.

If the bus is boarding or unloading passengers, the layout determination differs from the truck layouts. Specifically, if the bus is boarding or unloading passengers, such as may be indicated by a sensor indicating that the passenger boarding door is open, as determined at 250, then the display layout 252 is activated. The layout 252 provides a large, half screen view of the passenger side of the vehicle, with smaller views of the front and rear cameras. Additional views of the passenger boarding area or passenger seating area may be provided on the screen and/or in the recorded video channels. For an articulated bus, additional cameras and views may be added.

If the bus passengers are not boarding at 250, the view layout for reverse travel at 254 is shown using the layout 256. If not in reverse and not above the forward threshold speed, the layout 258 is selected.

The examples of display layouts are provided for a vertical or portrait orientation of the computer device display. The display layouts may be modified or reoriented for a horizontal or landscape orientation of the computer device. One computer device display is preferably provided in the vehicle such as by a tablet computer mounted in the driver area of the vehicle. It is also possible that two or more displays may be provided.

Figure 8A:
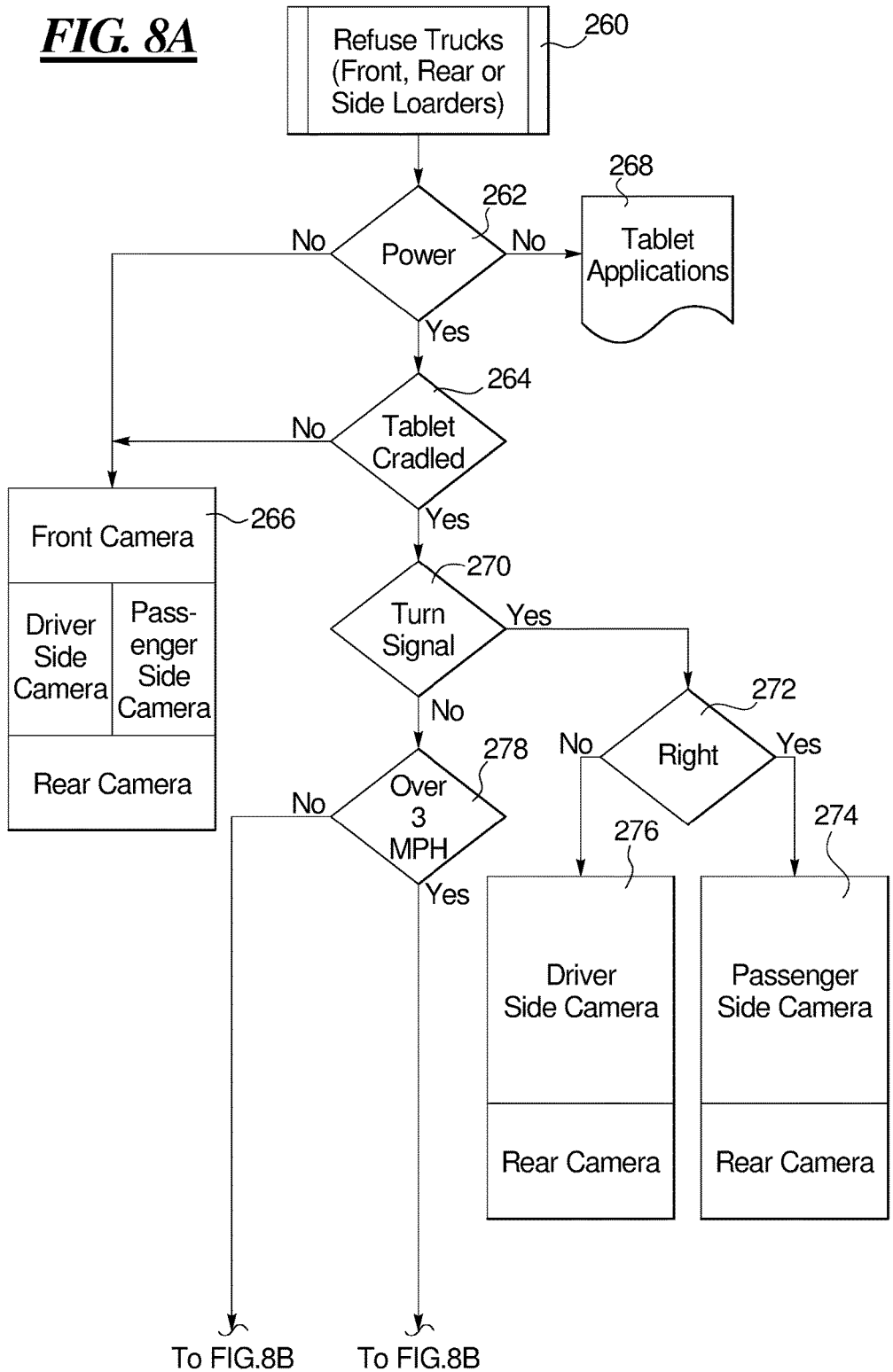
Figure 8B:
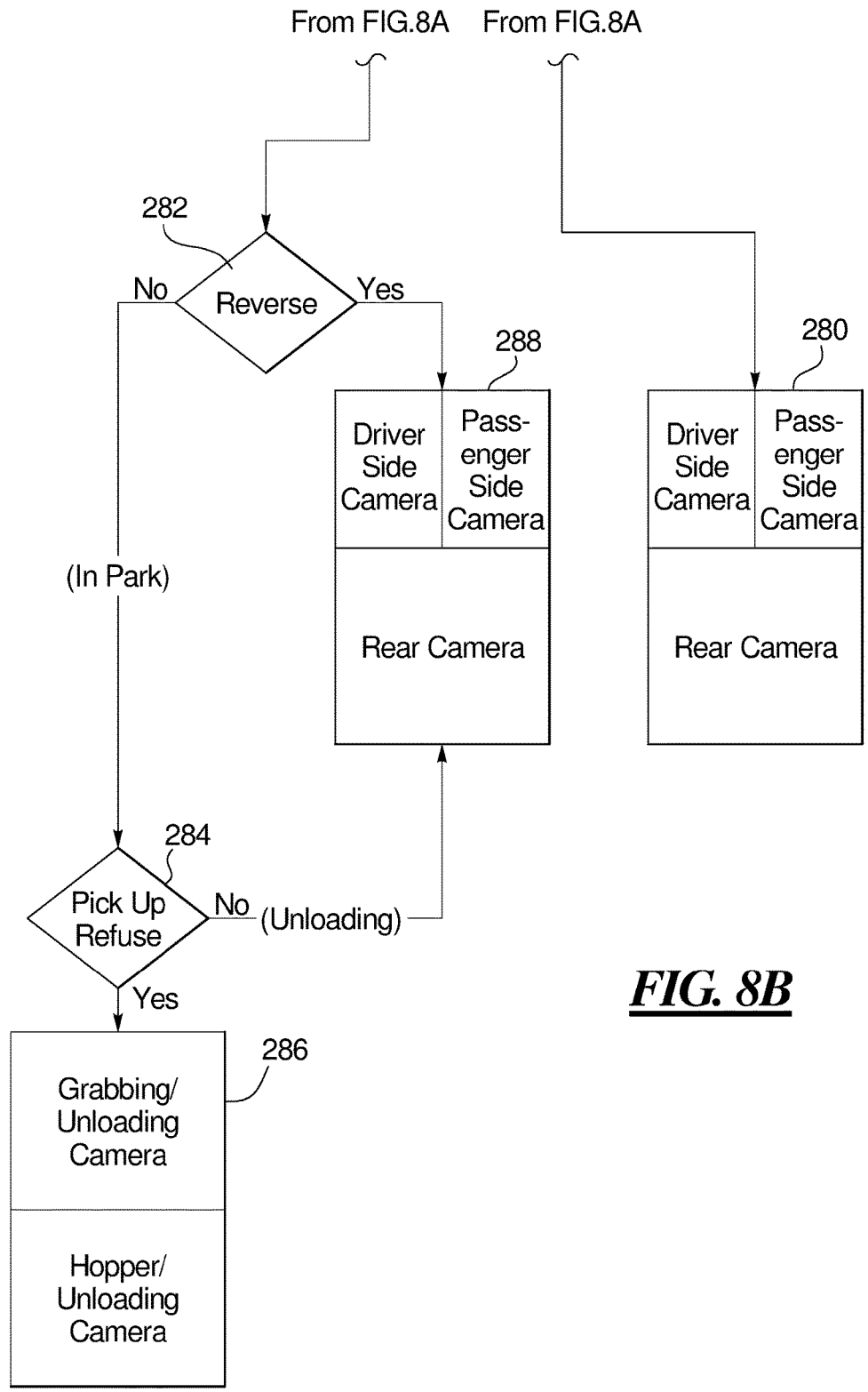

Other types of vehicles may benefit from the use of cameras directed toward areas about the vehicle and display of the video data on a display screen in the vehicle that is visible to the driver via a layout on the display screen. Together, FIGS. 8A and 8B provide an example for a refuse collection truck. The user selects a refuse truck selection at 260 from the menu of possible screen layouts, or the set of display layouts may be selected during initial set up. As with the above-described layout options, connection of external power is detected at 262 and cradling of the tablet computer device is detected at 264. A normal layout 266 is selected, with the front, rear, and side cameras shown. Tablet applications 268 are accessed at 268. If the vehicle's turn signal is activated at 270, a determination is made as to which turn signal at 272 and either a passenger side dominated view 274 or a driver side dominated view 276 is displayed.

The refuse truck may have a lower threshold for forward motion to trigger a change in views than a truck or bus. At 278, a determination is made as to whether the threshold has been exceeded and, if so, the refuse truck view is changed to the three part layout view 280 of approximately equal left, right and rear cameras for speeds over 3 mph, for example. For speeds under the threshold speed, an inquiry is made as to whether the vehicle is in reverse, at 282. If not in reverse and the vehicle is stopped or in park, an inquiry is made as to whether vehicle operation sensors show that the refuse truck is picking up refuse, at 284.

If the vehicle is operating to pick up refuse, the display layout is changed at 286 to show a grabbing and unloading camera for a portion of the screen and a hopper/compactor camera for another portion of the display screen. The driver may thereby see what is happening at the refuse container grabbing, grasping or gripping mechanism and thereby verify that people are away from the refuse container and from the truck body as the refuse container is being grasped by the grasping mechanism. The video is used to determine, among other things, that the refuse container is firmly grasped by the gripper mechanism of the truck and that the container is not dropped or slammed down when placed back on the ground.

The video view of the refuse hopper and compactor may be checked by the driver to ensure that power lines or tree branches are not in the way, the area is clear, and that the compactor has compressed the trash before more refuse is added. The view may be checked to see what has been dumped into the compactor, such as whether a refuse bin has fallen into the compactor. This is possible even while the driver remains in the cab or passenger compartment of the refuse truck. The recorded video data of these data channels or cameras, as stored on the computer device or other storage location, may be used to determine if problems occurred during the refuse pickup.

If the inquiry 284 determines that refuse is not being picked up, such as when the truck is unloading, or if the reverse operation sensor 282 senses reverse operation, the display layout 288 is shown, which is dominated by the rear view camera.

Automated switching of the video display layouts is thereby provided without requiring direct user input.

Other display layouts may be provided as needed, having fewer or more camera views. The system provides driver assistance, video data recording and storage, and video playback and display, as well as user controllable access to the recorded video data. Vehicle operation sensors and system inputs may include not only passenger loading sensors or loading/unloading sensors, but also lane departure sensors, blind spot detection sensors, vehicle diagnostic sensors, and motion activated cameras, such as may be used for video surveillance. An integrated global positioning system may record position data along with the video data.

The video system may be provided on commercial equipment, specialty vehicles, vocational vehicles, trucks, buses, cars, recreational vehicles and other vehicles. Other examples include video systems for semi-trailers, tank trailers, log carriers, flatbed trucks, motorhomes, RVs, rigid buses, articulated buses, shuttle buses, and school buses. Vocational vehicles such as refuse trucks, cement mixers, dump trucks and box trucks may be provided with the video system. Specialty vehicles such as fire trucks, tow trucks and ambulances, and mail delivery and package delivery vehicles may benefit from the present video system.

The driver's field of view is expanded by the video system. The recorded video and vehicle operation data may be played back, transmitted, stored, and/or analyzed. The stored video and vehicle data may be confirmed by a proof of delivery verification upon storage or transmittal. The stored data may be marked for vehicle operational events, such as hard braking, or other vehicle or driver events. The vehicle operation data may be used to indicate vehicle range, estimated time of arrival, fuel tax reporting, state mileage determinations, fuel usage or miles per gallon determinations, and driving data such as average speed, highest speed, time driven, time spent idling or moving, average engine speed, or the like. Drivers and fleet operators may use the recorded data for inspection records, driver logs, DOT logs or the like.

Up to six or more cameras may be provided on the vehicle to show front, sides and rear views. In certain examples, four of the cameras are displayed as dynamic, near real time (very low delay) video streams on the display device. Power may be maintained to the cameras and recording system when the vehicle engine is off, so that the system is used for surveillance or driver inspection.

Recording of the video data may be provided in selectable modes including continuous recording, ignition initiated recording, scheduled recording, and event recording. All cameras or only selected cameras may be recorded in each mode. A preferred system records up to six cameras along with audio data and vehicle operations data. Vehicle operations may include condition information from the electronic control module of the vehicle, speed data, engine RPM data, cruise control status, seatbelt sensor, air bag sensor, GPS coordinates or time synched GPS data, hard stop data, or other data. Accident data may be recoded and saved for several minutes before and after an accident. The system may include a manual marker control to mark data for saving. Otherwise, the data is stored in a first in, first out fashion.

The stored data may be stored in full resolution, a reduced resolution, or a mix of both. The tablet computer may include a user facing camera that is activated to obtain video data of the vehicle driver during operation of the vehicle. The tablet computer may include a microphone for detecting sounds within the vehicle. The driving facing camera of the tablet computer and the microphone of the tablet computer may be activated for recording a further video channel and an audio channel that is recorded along with the video data from the vehicle mounted cameras. A view of the driver may be reviewed in the recorded data along with the video data of views outside the vehicle. The sound recording may be played back as well. The stored data may be recorded on the internal memory of the computer device, on removable data such as a memory card, or on an external memory device such as an external memory drive.

The system may permit user settings and user control for some or all settings. The user may replay information or manage the data, in some embodiments, whereas other embodiments may block a user from the data management. In certain embodiments, the system prevents changes to the user settings or replay of stored data when the vehicle is in motion.

While the present invention is illustrated by description of several examples and while the illustrative examples are described in detail, it is not the intention of the applicants to restrict or in any way limit the scope of the appended claims to such detail. Also, it is to be understood that the phraseology and terminology employed herein are for the purpose of the description and should not be regarded as limiting the appended claims. Additional advantages and modifications within the scope of the appended claims will readily appear to those sufficed in the art. The disclosure in its broader aspects is therefore not limited to the specific details, representative apparatuses and methods, and illustrative examples shown and described. Accordingly, departures may be made from such details without departing from the spirit or scope of applicants' general concept.

What is claimed is:

1. A video system for a vehicle for serving video data to a computer device, comprising:
    a plurality of video cameras mounted on the vehicle and operable to obtain video data of a plurality of areas outside of the vehicle;
    the computer device being disposed within a passenger compartment of the vehicle in a position for viewing of a display screen of the computer device by a driver of the vehicle, the computer device being a portable computer device that is selectively removable from the vehicle by a user, the portable computer device including an internal memory within the portable computer device, the portable computer device including an operating system and being configured for executing applications;

a processing unit mounted in the vehicle, the processing unit including a processor, the processing unit being operable to receive the video data from the plurality of video cameras, the processing unit being operable to transmit the video data to the computer device for recording of the video data on the computer device;

the computer device being connected to display video data from selected ones of the plurality of video cameras, the display screen being operable to alternatively display a plurality of layouts of the video data, the display screen being configured to simultaneously display video data from a plurality of video cameras in a corresponding plurality of portions of the display screen, wherein the portable computer device is configured for viewing the stored video data from the video cameras while the portable computer device is removed from the vehicle; and a plurality of sensors mounted in or on the vehicle, the plurality of sensors being connected to communicate sensor signals to the processing unit, the layout being displayed on the computer device changing between ones of the plurality of layouts depending on a sensor signal received by the processing unit, the plurality of sensors include a blind spot detection sensor connected to the processing unit, the display layouts including a layout on the display screen showing a view of the blind spot to reveal an approaching vehicle or road hazard.

2. A video system as claimed in claim 1, wherein the vehicle includes a semi-trailer, the video system being for the semi-trailer.

3. A video system as claimed in claim 2, further comprising: a wireless transmitter for transmitting the video data from at least one of the video cameras to the processing unit.

4. A video system as claimed in claim 3, wherein the wireless transmitter includes a WiFi wireless communication system for transmitting the video data from at least one of the video cameras to the processing unit.

5. A video system as claimed in claim 1, wherein at least one of the video layouts displayed in the display screen include a simulated wide view with video data of multiple ones of the video cameras.

6. A video system as claimed in claim 1, wherein the processing unit includes a multiple core processor.

7. A video system as claimed in claim 6, wherein the multiple core processor is a quad core processor.

8. A video system as claimed in claim 1, wherein the plurality of video cameras includes at least six video cameras.

9. A video system as claimed in claim 1, wherein the plurality of video cameras includes at least eight video cameras, wherein ones of the video cameras are connected to the processing unit via WiFi communication.

10. A video system as claimed in claim 1 wherein at least one of the video cameras is connected to the processing unit by one of an Ethernet connection or a USB connection.

11. A video system as claimed in claim 1, wherein the portable computer device is a tablet computer, and wherein the processing unit is configured and operable to configure the video data for display on the tablet computer.

12. A method for display of video in a vehicle, comprising:

displaying video data on a display screen of a portable computer device disposed in a passenger compartment of the vehicle, the video data including video data from a plurality of video cameras mounted on a vehicle, the displaying including simultaneously displaying the video data from a plurality of the video cameras in a corresponding plurality of different portions of the display screen;

sensing a condition of the vehicle;

changing a layout of the video data displayed on the display screen to a first layout upon sensing the condition of the vehicle;

sensing at least one of a lane departure or an object in a blind spot of the vehicle;

changing the layout of the video data displayed on the display screen to a layout showing the video data of the lane departure if the lane departure is sensed or showing the video data of the blind spot if an object in the blind spot is sensed;

recording the video data on an internal memory within the portable computer device; and configuring the video data of the plurality of video cameras for display on the portable computer device, the portable computer device being a tablet computer having an operating system and being configured for executing applications, the portable computer device being configured for displaying the video data when removed from the vehicle.

13. A method as claimed in claim 12, wherein the sensing of the lane departure is by a lane departure sensor.

14. A method as claimed in claim 12, wherein the sensing of the object in the blind spot is by a blind spot sensor.

15. A method as claimed in claim 12, further comprising: transmitting the video data for display of the blind spot via WiFi communication.

16. A method as claimed in claim 12, further comprising: transmitting the video data for display of the blind spot via a wired connection, the wired connection including one of Ethernet or USB connection.

17. A method as claimed in claim 12, further comprising: displaying a layout on the display screen that includes a simulated wide view with data of a plurality of video cameras.

18. A video system for a vehicle for serving video data to a computer device, comprising:

a plurality of video cameras mounted on the vehicle and operable to obtain video data of a plurality of areas outside of the vehicle;

the computer device being disposed within a passenger compartment of the vehicle in a position for viewing of a display screen of the computer device by a driver of the vehicle, the computer device being a portable computer device that is selectively removable from the vehicle by a user, the portable computer device including an operating system and being configured for executing applications, the portable computer device being configured to store the video data from the video cameras within the portable computer device, the portable computer device being configured for displaying the stored video data on the display screen when the portable computer device is removed from the vehicle;

a processing unit mounted in the vehicle, the processing unit including a processor, the processing unit being operable to receive the video data from the plurality of video cameras, the processing unit being operable to transmit the video data to the computer device for recording of the video data on the computer device;

the computer device being connected to display video data from selected ones of the plurality of video cameras, the display screen being operable to alternatively display a plurality of layouts of the video data; and
a plurality of sensors mounted in or on the vehicle, the plurality of sensors being connected to communicate sensor signals to the processing unit, the layout being displayed on the computer device changing between ones of the plurality of layouts depending on a sensor signal received by the processing unit, the layouts including a plurality of portions of the display, each layout showing the respective video data only from a given camera in separate portions of the display.

* * * * *